(12) United States Patent
Ozawa et al.

(10) Patent No.: US 8,467,136 B2
(45) Date of Patent: Jun. 18, 2013

(54) DEVICE FOR TRANSFERRING OPTICAL ELEMENTS

(75) Inventors: Hidemasa Ozawa, Suwon-si (KR); Shi-hong Park, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 72 days.

(21) Appl. No.: 13/271,444

(22) Filed: Oct. 12, 2011

(65) Prior Publication Data
US 2012/0281296 A1 Nov. 8, 2012

(30) Foreign Application Priority Data
May 4, 2011 (KR) ................ 10-2011-0042630

(51) Int. Cl.
*G02B 15/14* (2006.01)
(52) U.S. Cl.
USPC ............ 359/700; 359/704; 359/694; 359/696
(58) Field of Classification Search
USPC ................................. 359/694–704, 811–830
See application file for complete search history.

(56) References Cited

U.S. PATENT DOCUMENTS

| 6,002,886 | A | 12/1999 | Tamura |
| 6,288,848 | B1 | 9/2001 | Shinohara et al. |
| 2012/0281298 | A1* | 11/2012 | Fukino .................... 359/700 |
| 2013/0033761 | A1* | 2/2013 | Koga et al. ............... 359/696 |

FOREIGN PATENT DOCUMENTS

| JP | 06-160690 A | 6/1994 |
| JP | 09-171133 A | 6/1997 |
| JP | 09-251125 A | 9/1997 |
| JP | 2009-217045 A | 9/2009 |

* cited by examiner

*Primary Examiner* — Mohammed Hasan
(74) *Attorney, Agent, or Firm* — Drinker Biddle & Reath LLP

(57) ABSTRACT

There is provided a device for transferring an optical element including: a differential transmitter including an intermediate ring rotatably with respect to a housing and having a plurality of openings on its circumference, first decelerating members rotatably inserted into ones of the openings, a first transmitting ring disposed on one side of the intermediate ring to contact the first decelerating members, and a second transmitting ring disposed on an opposite side of the intermediate ring; a driving element generating a driving force to rotate the first transmitting ring; a manual manipulation ring transmitting a rotation force generated due to manual manipulation to the second transmitting ring; a moving portion that supports the optical element and moving along the direction of an optical axis; and a cam rotating due to connection with the intermediate ring and having a cam groove connected with the moving portion.

16 Claims, 13 Drawing Sheets

DEVICE FOR TRANSFERRING OPTICAL ELEMENTS

CROSS-REFERENCE TO RELATED PATENT APPLICATION

This application claims the priority benefit of Korean Patent Application No. 10-2011-0042630, filed on May 4, 2011, in the Korean Intellectual Property Office, the entirety of which is incorporated herein by reference.

BACKGROUND

1. Field of the Invention

The invention relates to a device for transferring an optical element, and more particularly, to a device for transferring an optical element configured to realize both an auto focusing (AF) function for automatically moving an optical element such as a lens, and a manual focusing (MF) function for allowing a user to manipulate focus.

2. Description of the Related Art

A digital photographing apparatus such as a camera or camcorder has a function for adjusting the focus or zoom by moving the position of an optical element such as a lens. In general, there are two types of focusing functions: an AF function for automatically adjusting the position of a lens to obtain a correct focus without a user's separate manipulation, and a MF function for manually adjusting the position of a lens by fine tuning a focus with a user's eyes.

With wide dissemination of digital photographing devices, there is a need for a function that allows a user to freely adjust the position of a lens as desired at any time. Conventionally, to implement such a function, a separate switch, which allows a user to select between AF mode and MF mode, is provided. However, this approach may cause inconvenience of manipulating the switch.

Furthermore, in order to realize both AF and MF functions, mechanical elements having a complicated structure and a large volume need to be employed to connect or block a driving force generated by a driving element for performing an AF function.

While an AF feature is convenient for taking pictures, it may be difficult to fine tune the position of a lens like in an MF mode. When the AF function is set to fine tune the position of a lens, however, a user may have to rotate an MF ring over a wide angular range in an MF mode. Another drawback is that it may be difficult to hold a camera when the MF ring also rotates while the AF function is being performed.

SUMMARY

The invention provides a device for transferring an optical element configured to automatically adjust a position of an optical element such as a lens, and at the same time enable a user to manually fine tune the position of the optical element, if desired. That is, the invention provides a device for transferring an optical element that allows execution of both an automatic adjusting function for automatically moving the optical element, and a manual adjusting function performed by user manipulation without manipulating a separate switch.

The invention also provides a device for transferring an optical element having a simple construction and a compact design, which allows execution of both the automatic adjusting function and the manual adjusting function.

According to an aspect of the invention, there is provided a device for transferring an optical element, including: a housing; a differential transmitter including an intermediate ring that is cylindrical, is disposed rotatably with respect to the housing, and has a plurality of separate openings formed along a circumference thereof, first decelerating members inserted into ones of the plurality of openings so as to rotate, within the openings, a first transmitting ring disposed inside or outside of the intermediate ring so as to contact the first decelerating members and rotate with respect to the intermediate ring, and a second transmitting ring disposed inside or outside of the intermediate ring and opposite to the first transmitting ring so as to contact the first decelerating members and rotate with respect to the intermediate ring; a driving element installed in the housing and generating a driving force upon application of a signal from outside in order to rotate the first transmitting ring; a manual manipulation ring disposed rotatably with respect to the intermediate ring and transmitting a rotation force generated due to manual manipulation to the second transmitting ring; a moving portion that supports the optical element and is disposed in the housing so as to move along the direction of an optical axis; and a cam rotating in connection and together with the intermediate ring, and having a cam groove connected with the moving portion.

The second transmitting ring may have a first contact surface extending in a circumferential direction so as to contact one surface of each of the first decelerating members.

The differential transmitter may include a first retainer disposed in front of the second transmitting ring and having a second contact surface extending in a circumferential direction so as to contact another surface of each of the first decelerating members, a cover ring disposed in front of the first retainer and combined with an end of the second transmitting ring, and a first elastic ring disposed between the cover ring and the first retainer and applying an elastic force.

The manual manipulation ring may include a stepped portion projecting inward to face the cover ring. The device may further include a second elastic ring disposed between the stepped portion and the cover ring and applying an elastic force.

The differential transmitter may further include a pressure member that is disposed between the housing and the manual manipulation ring and presses the second transmitting ring against the manual manipulation ring.

The device may further include an input ring disposed rotatably with respect to the first transmitting ring and rotating due to the driving element; and an engaging member engaging the input ring with the first transmitting ring.

The device may further include a support member disposed between the housing and the input ring and rotatably supporting the input ring with respect to the housing.

The device may further include a plurality of second decelerating members, each being inserted into a corresponding one of a plurality of second openings separated along a circumference of the first transmitting ring; and an input ring that is disposed rotatably with respect to the first transmitting ring so as to contact the second decelerating members and rotate due to the driving element.

The input ring may have a first contact surface extending in a circumferential direction so as to contact one surface of each of the second decelerating members. The device may further include a second retainer that is disposed in front of the input ring and has a second contact surface corresponding to the first contact surface and extending in the circumferential direction so as to contact another surface of each of the second decelerating members, a cover ring disposed in front of the second retainer and combined with an end of the input ring, and a third elastic ring disposed between the cover ring and the second retainer and applying an elastic force.

The device may further include an input ring rotating due to the driving element, a support ring that is rotatably disposed in front of the input ring and has a plurality of separate third openings formed in a circumferential direction at positions contacting the input ring, and a roller rotatably combined with the third openings so as to contact the input ring and rotating around a radial axial line from a center of the support ring.

The device may further include a support member disposed between the housing and the input ring and rotatably support the input ring with respect to the housing.

The driving element may be a vibration motor producing repeated vibrations upon application of an electrical signal.

In order to maintain the stationary state of the second transmitting ring while the first transmitting ring rotates due to the driving element, a frictional force between the manual manipulation ring and the housing may be set greater than a driving force generated by the driving element and transmitted through the first decelerating members and the second transmitting ring.

In order to maintain a stationary state of the first transmission ring while the second transmission ring rotates due to the manual manipulation ring, a rotation force that is transmitted to the driving element through the first decelerating member and the second transmitting ring by rotating the manual manipulation ring due to manual manipulation may be set less than a static friction force acting on the driving element that remains stationary The device may further include a fixed lens barrel disposed inside the differential transmitter, kept fixed relative to the housing, and having a linear groove extending in the direction of the optical axis. The moving portion may have a cam protrusion fitted in the linear groove. The cam may have a cylindrical shape and be disposed between the fixed lens barrel and the differential transmitter with the cam groove engaged with the cam protrusion.

The intermediate ring may have a protrusion projecting toward the cam groove, and the cam may have a groove engaged with the protrusion.

The cam may include an outwardly projecting guide roller, and the intermediate ring may have a connecting member projecting toward the guide roller and supporting an outside of the guide roller.

A device for transferring an optical element, according to an embodiment of the invention as described above allows an automatic adjustment of the position of the optical element due to a driving force generated by a driving element and a manual adjustment of its position by manipulating a manual manipulation ring as desired by a user without using a separate transition switch.

Another advantage is that it is possible to realize both an auto focusing function and a manual focusing function by employing a simple differential transmitter including first and second transmitting rings and an intermediate ring instead of complicated mechanical elements. Thus, a device for transferring an optical element having a simple structure and a compact design can be provided.

A differential transmitter including first and second transmitting rings and an intermediate ring is also constructed to prevent a manual manipulation ring from rotating due to a driving force generated by a driving element when an automatic focusing mode is performed and block and blocks a rotation force of the manual manipulation ring being transmitted to the driving element when a manual focusing mode is performed. The above construction makes it possible to independently set a pressure for transmitting a rotation force of the manual manipulation ring and a pressure for transmitting a driving force generated by the driving element, thereby permitting optimized transmission or use of the driving force without degrading the efficiency of the driving element and optimized use of the rotation force of the manual manipulation ring.

A device for transferring an optical element, according to an embodiment of the invention is also constructed such that a driving force generated by the driving element is decelerated by a decelerator such as a second decelerating member or roller disposed between the driving element and the differential transmitter and then decelerated again by the differential transmitter. In this way, the device allows adjustment of the position of the optical element by decelerating the driving force to one quarter, thereby enabling fine tuning of the position of the optical element in an automatic focusing mode.

Furthermore, the device is constructed such that a rotation force of the manual manipulation ring transmitted through the second transmitting ring is decelerated by one half as it passes through the first decelerating member and the intermediate ring, thereby allowing a convenient use of a manual focusing function without needing to rotate the manual manipulation ring to a large extent.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The construction and operation of a device for transferring an optical element, according to an embodiment of the invention, are described in detail with reference to the attached drawings.

Figure 1:
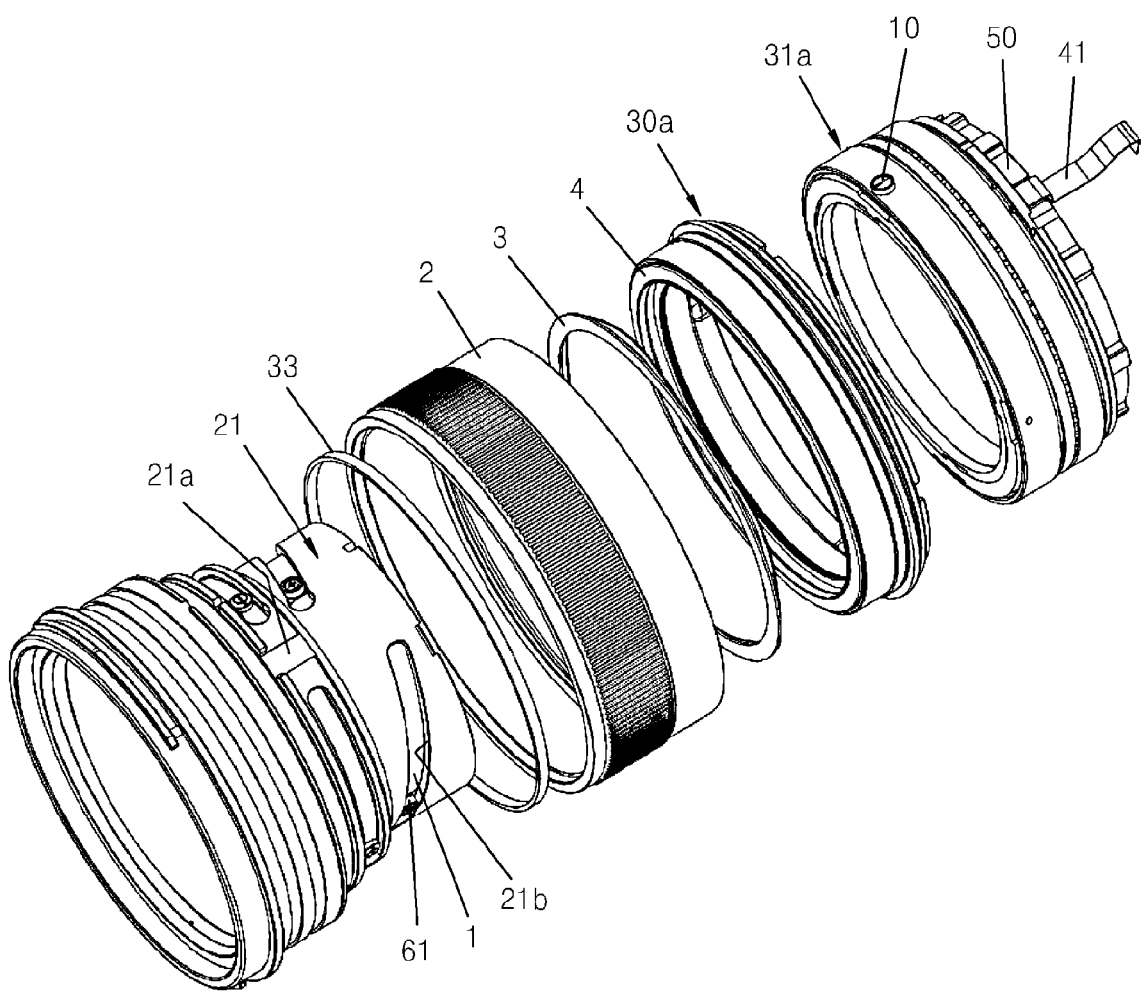
FIG. 1 is a schematic exploded perspective view illustrating components of a device for transferring an optical element, according to an embodiment of the invention.
Figure 2:
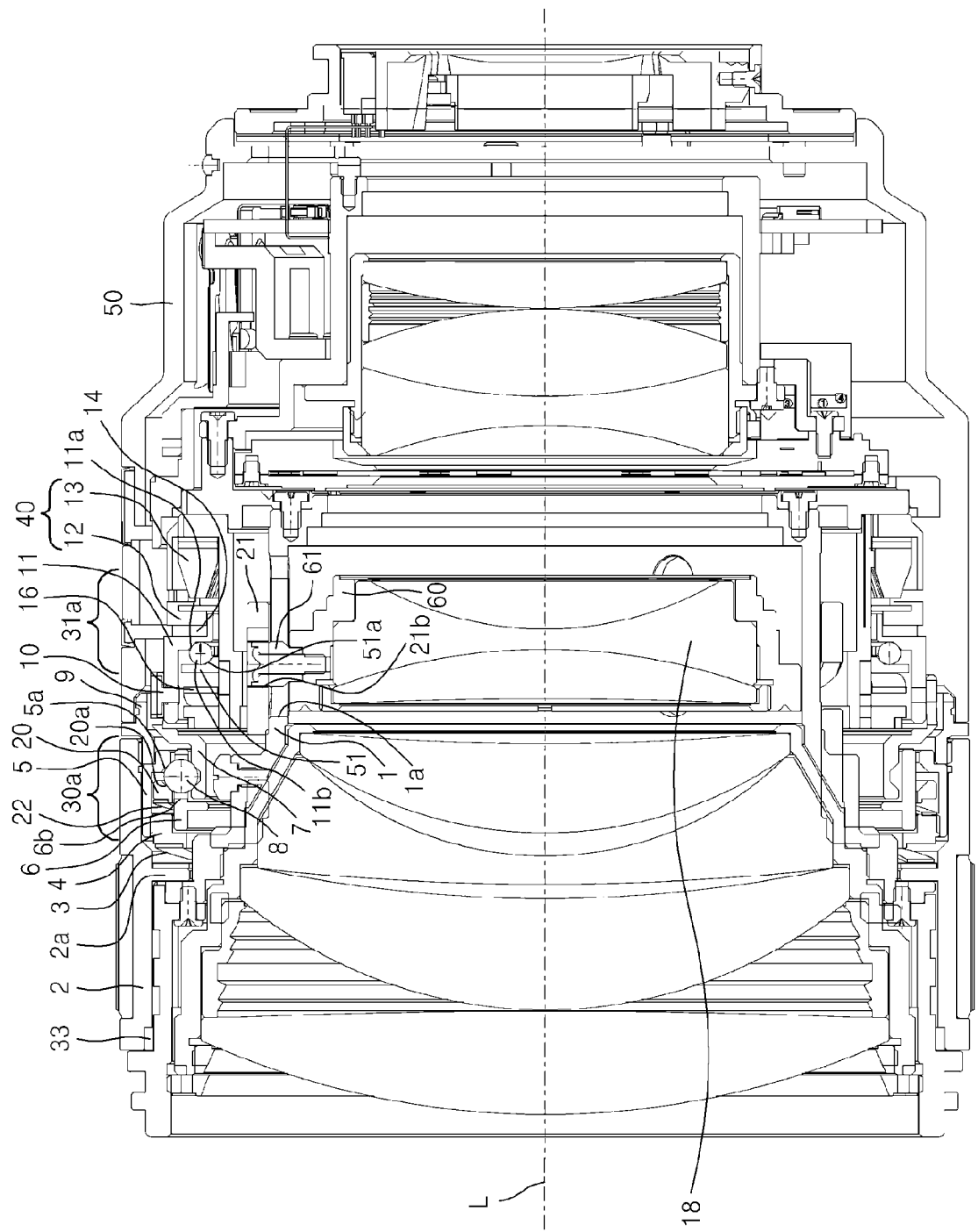
FIG. 2 is an assembled side cross-sectional view of the device of FIG. 1.

FIG. 1 is a schematic exploded perspective view illustrating components of a device for transferring an optical element 18, according to an embodiment of the invention. FIG. 2 is an assembled side cross-sectional view of the device of FIG. 1. Referring to FIGS. 1 and 2, the device for transferring the optical element 18, according to the present embodiment, includes a housing 50, a driving element 40 that is installed in the housing 50 and generates a driving force, a differential transmitter 30a that is driven by the driving element 40 and transmits power, a manual manipulation ring 2 rotating due to manual manipulation and transmitting a rotation force to some components in the differential transmitter 30a, a moving portion 60 that supports the optical element 18 and is disposed in the housing 50 so as to move along the direction of an optical axis L, and a cam 21 having a cam groove 21b connecting with the moving portion 60.

The housing 50 serves to support other components in the device, and a driving unit 31a including the driving element 40 is disposed in front of the housing 50. The driving unit 31a also has an engaging member 10 mounted on its outer circumferential surface so as to rotate in a circumferential direction. A driving force generated by the driving unit 31a is transmitted to the differential transmitter 30a disposed ahead of the driving unit 31a through the engaging member 10. The driving unit 31a generates a driving force by operating upon application of an electrical signal from outside through a circuit board 41.

The differential transmitter 30a transmits the driving force, generated by the driving unit 31a or generated when the manual manipulation ring 2 rotates, to the cam 21.

In general, the terms 'driving force' and 'rotation force' are similar in meaning and represent forces that make ring-shaped components rotate. However, hereinafter, the driving force refers to a force required to operate a device for transferring an optical element using a force generated by applying an electrical signal to the driving unit 31a. The rotation force refers to a force required to operate the device for transferring an optical element by manually manipulating the manual manipulation ring 2

The driving unit 31a includes the driving element 40, an input ring 11 rotating due to a driving force generated by the driving element 40, and the engaging member 10 projecting outward with respect to the input ring 11. In the present embodiment, the driving element 40 includes a stator 13 producing repeated vibrations upon application of an electrical signal, and a rotor 12 that is deformed by the stator 13 and transmits a force.

The stator 13 may be a stack-type piezoelectric element manufactured by stacking a plurality of electrodes or a piezoelectric single layer element. When alternating current (AC) is applied, the stator 13 generates vibrations according to a drive waveform of the AC.

The input ring 11 is disposed in front of the rotor 12 with a buffer member 14 interposed therebetween. The input ring 11 is rotatably mounted with respect to a driving element support 51 disposed in the housing 50. The input ring 11 has a ring shape and rotates around the optical axis L because a support member 11b is disposed between the driving element support 51 and the input ring 11.

The input ring 11 and the driving element support 51 respectively have seating surfaces 11a and 51a corresponding to a surface of the support member 11b. Thus, the support member 11b rotates between the input ring 11 and the driving element support 51 while supporting the input ring 11 so as to rotate in the direction of the optical axis L.

Because a front of the driving element support 51 is elastically supported by a pressure ring 16 within the driving unit 31a, a predetermined pressure is maintained among the input ring 11, the driving element 40, and the driving element support 51 within the driving unit 31a. Thus, a driving force generated by the driving element 40 can be efficiently transmitted to the input ring 11. Because the driving unit 31a having the above-mentioned constitution is constructed as a single module, a pressure set within the driving unit 31a by the pressure ring 16 does not affect other components outside the driving unit 31a.

A fixed lens barrel 1 is attached to the housing 50. The fixed lens barrel 1 has a linear groove 1a extending in the direction of the optical axis L and remains fixed to the housing 50.

The moving portion 60 is disposed inside the fixed lens barrel 1 so as to support the optical element 18 and move in the direction of the optical axis L. The moving portion 60 has a cam protrusion 61 projecting outward to fit into the linear groove 1a of the fixed lens barrel 1.

The cam 21 is disposed outside the fixed lens barrel 1. The cam 21 has the cam groove 21b engaged with the cam protrusion 61 so is rotatably mounted with respect to the fixed lens barrel 1. As the cam 21 rotates with respect to the fixed lens barrel 1, the cam protrusion 61 engaging with the cam groove 21b is guided by the cam groove 21b so that the moving portion 60 can move within the fixed lens barrel 1.

Figure 3:
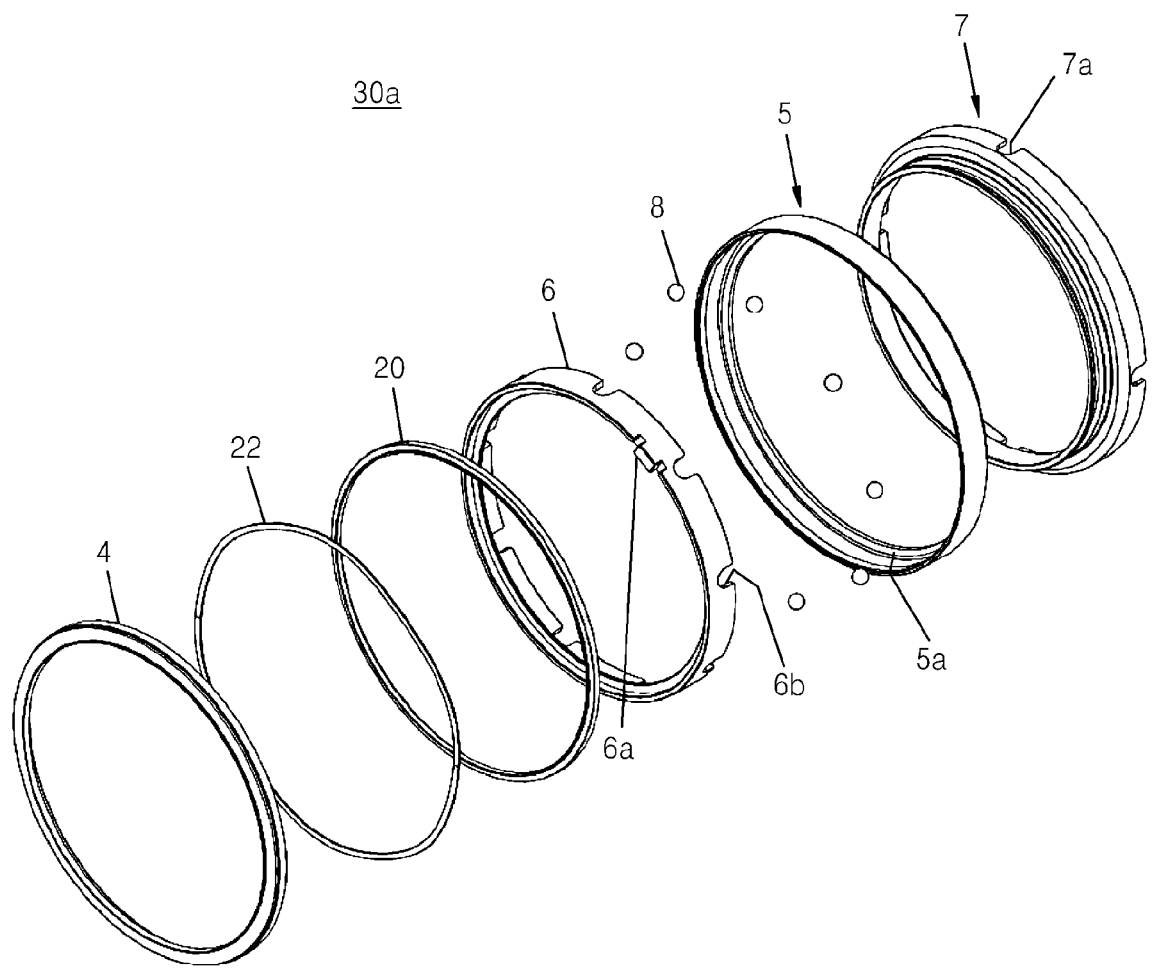
FIG. 3 is a schematic exploded perspective view of a differential transmitter for the device of FIG. 1.
Figure 4:
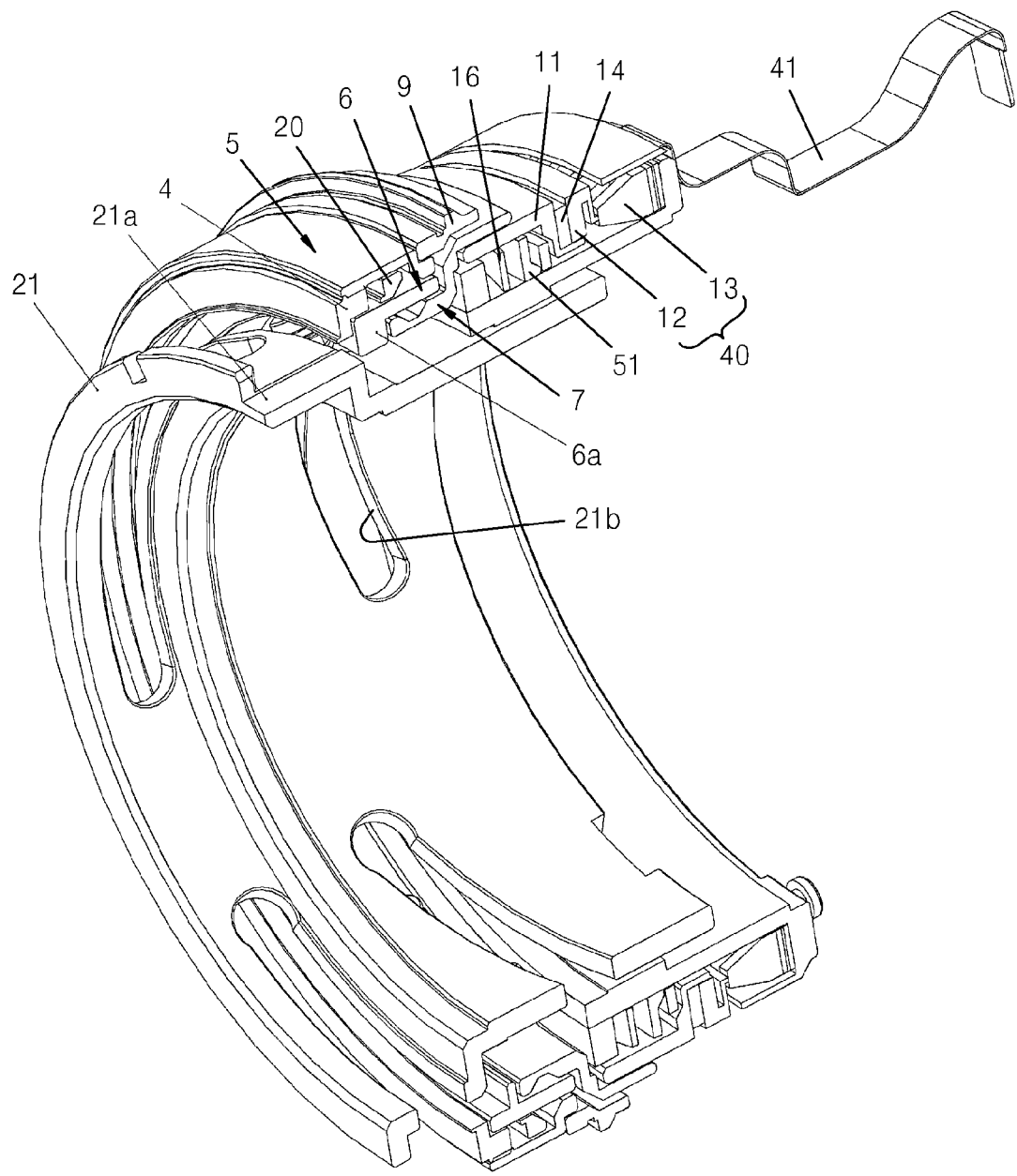
FIG. 4 is a cutaway view of a portion of the device of FIG. 1.

FIG. 3 is a schematic exploded perspective view of the differential transmitter 30a of the device of FIG. 1. FIG. 4 is a cutaway view of a portion of the device of FIG. 1.

Referring to FIGS. 3 and 4, the differential transmitter 30a includes an intermediate ring 6, first decelerating members 8 rotatably fitted in each of a plurality of openings 6b in the intermediate ring 6, a first transmitting ring 7 disposed inside the intermediate ring 6 so as to contact the first decelerating members 8, and a second transmitting ring 5 disposed outside the intermediate ring 6 so as to contact the first decelerating members 8.

Each of the intermediate ring 6, first transmitting ring 7, and second transmitting ring 5 is rotatably disposed around the optical axis L with respect to the housing 50. Because each of the first and second transmitting rings 7 and 5 are rotatable with respect to the intermediate ring 6, the intermediate ring 6 rotates as the first or second transmitting ring 7 or 5 rotates.

The intermediate ring 6 is cylindrical and includes the plurality of separate openings 6b formed along the circumference thereof. The first decelerating members 8 are rotatably inserted into each of the plurality of openings 6b of the intermediate ring 6. The intermediate ring 6 and the first decelerating members 8 decelerate a force generated due to rotation of the first or second transmitting ring 7 or 5 by one half and transmit the resulting force to the cam 21.

A projection 6a formed at a front of the intermediate ring 6 is inserted into a groove 21a formed on an outer surface of the cam 21. Thus, when the intermediate ring 6 rotates, the cam 21 rotates together with the intermediate ring 6.

The first transmitting ring 7 is disposed inside the intermediate ring 6 so as to contact the first decelerating members 8 and rotate with respect to the intermediate ring 6 and transmits a driving force received from the driving element 40 to the intermediate ring 6. The engaging member 10 of the driving unit 31a is fitted in an engaging hole 7a. In this way, the first transmitting ring 7 is connected to the input ring 11 rotating due to the driving element 40 by the engaging member 10. Thus, a driving force generated by the driving element 40 is delivered to the first transmitting ring 7 via the input ring 11.

The second transmitting ring 5 is disposed outside of the intermediate ring 6 so as to contact the first decelerating members 8 and rotate with respect to the intermediate ring 6 and transmits a rotation force received from the manual manipulation ring 2 to the intermediate ring 6. Because the second transmitting ring 5 remains in contact with the manual manipulation ring 2, a rotation force generated by the rotation of the manual manipulation ring 2 may be transmitted to the second transmitting ring 5 in order to rotate the second transmitting ring 5.

The second transmitting ring 5 has a first contact surface 5a extending in a circumferential direction so as to contact first surfaces of the first decelerating members 8. The differential transmitter 30a further includes a first retainer 20 disposed in front of the second transmitting ring 5 and having a second contact surface 20a extending in a circumferential direction so as to contact other surfaces of the first decelerating members 8, a cover ring 4 disposed in front of the first retainer 20 and combined with an end of the second transmitting ring 5, and a first elastic ring 22 disposed between the cover ring 4 and the first retainer 20 and applying an elastic force. The device for transferring the optical element 18 further includes a pressure member 9 that is positioned between the housing 50 and the manual manipulation ring 2 and presses the second transmitting ring 5 against the manual manipulation ring 2.

The differential transmitter 30a having the above-described construction is realized as a single module. A force generated when the first retainer 20 and the second transmitting ring 5 apply a predetermined pressure to contact with the first decelerating members 8 may be set within the differential transmitter 30a by the first elastic ring 22 disposed inside the cover ring 4. Because the first elastic ring 22 is positioned inside the cover ring 4, the pressure set within the differential transmitter 30a does not affect other components outside the differential transmitter 30a.

Referring again to FIGS. 1 and 2, the manual manipulation ring 2 includes a stepped portion 2a projecting inward to face the cover ring 4 and extending in a circumferential direction. A second elastic ring 3 is disposed between the stepped portion 2a and the cover ring 4. The second elastic ring 3 applies an elastic force between the stepped portion 2a and the cover ring 4 in order to generate a frictional force.

Due to the operation of the second elastic ring 3 and the pressure member 9, an inertial force generated by the manual manipulation ring 2 is exerted on the second transmitting ring 5. Thus, the second transmitting ring 5 remains stationary while the first transmitting ring 7 rotates due to the driving element 40. That is, in order to maintain the stationary state of the second transmitting ring 5 while the first transmitting ring 7 rotates due to the driving element 40, a frictional force set between the manual manipulation ring 2 and the housing 50 may be greater than a driving force generated by the driving element 40 and transmitted through the first decelerating members 8 and the second transmitting ring 5. To achieve this, a friction maintaining ring 33 is disposed between the fixed lens barrel 1 and the manual manipulation ring 2. When a user rotates the manual manipulation ring 2, the friction maintaining ring 33 supports the manual manipulation ring 2 so that it is rotatable with respect to the housing 50. Conversely, when the user does not rotate the manual manipulation ring 2, the friction maintaining ring 33 maintains a friction between the manual manipulation ring 2 and the fixed lens barrel 1 so as to prevent the manual manipulation ring 2 from rotating due to a force transmitted from the driving element 40.

When the user rotates the manual manipulation ring 2, the second transmitting ring 5 rotates due to friction acting among the manual manipulation ring 2, the cover ring 4, and the second transmitting ring 5. While the second transmitting ring 5 rotates due to the manual manipulation ring 2, the first transmitting ring 7 may maintain a stationary state. To achieve this, a rotation force that is delivered to the driving element 40 through the first decelerating members 8 and the first transmitting ring 7 by rotating the manual manipulation ring 2 due to manual manipulation is set less than a static friction force acting on the driving element 40.

The device for transferring the optical element 18 having the above-described construction allows a user to rotate the manual manipulation ring 2 without manipulating a special transition switch, thereby enabling consecutive fine tuning and adjustment of the position of the optical element 18. A function for adjusting the position of the optical element 18 by a user rotating the manual manipulation ring 2 is referred to herein as a "manual adjusting mode".

Furthermore, the position of the optical element 18 may be adjusted by applying a control signal to the driving element 40 without a user rotating the manipulation ring 2. A function for adjusting the position of the optical element 18 using the driving element 40 is referred to herein as an 'automatic adjusting mode'.

When the automatic adjusting mode is executed, a control signal applied to the driving element 40 causes the input ring 11 and the first transmitting ring 7 coupled to the input ring 11 to rotate with each other. A rotation force of the first transmitting ring 7 is then transmitted to the first decelerating members 8 frictionally contacting the first transmitting ring 7.

The rotation force is also transmitted to the intermediate ring 6 having the first decelerating members 8 inserted thereinto. In this case, because the second transmitting ring 5 maintains frictional contact with the manual manipulation ring 2 that remains stationary, the second transmitting ring 5 and the first retainer 20 maintain a stationary state while the first decelerating members 8 are rotating.

Although a driving force generated by the driving element 40 is transmitted to the second transmitting ring 5 through the first transmitting ring 7 and the first decelerating members 8, the second transmitting ring 5 does not rotate because the driving force is set less than a force needed to rotate the manual manipulation ring 2.

Because a driving force generated by the driving element 40 is transmitted to the first transmitting ring 7 and the first decelerating members 8 when the second transmitting ring 5 is kept stationary, the first decelerating members 8 perform a rolling motion along the second transmitting ring 5. When the rotation velocity of the first transmitting ring 7 is V, the intermediate ring 6 and the cam 21 rotate at velocity V/2, which is one half of the rotation velocity V of the first transmitting ring 7.

When the driving element 40 operates as described above, the position of the optical element 18 can be automatically adjusted.

When a user rotates the manual manipulation ring 2, the manual adjusting mode may be performed to manually fine tune the position of the optical element 18. When the manual manipulation ring 2 rotates due to the user's manipulation, the second transmitting ring 5 rotates together with the manual manipulation ring 2.

Although electricity is not applied to the driving element 40 while the user manipulates the manual manipulation ring 2, the input ring 11 maintains a stationary state due to a static friction force acting on the driving element 40. The static friction force refers to a force acting between the stator 13 and the rotor 12 of the driving element 40.

When the input ring 11 ceases to rotate, the first decelerating members 8 perform a rolling motion along the second transmitting ring 5 because the first transmitting ring 7 connected to the input ring 11 maintains a stationary state. This, in turn, causes the intermediate ring 6 and the cam 21 to rotate together due to the rotation of the manual manipulation ring 2, thereby enabling adjustment of the position of the optical element 18.

Figure 5:
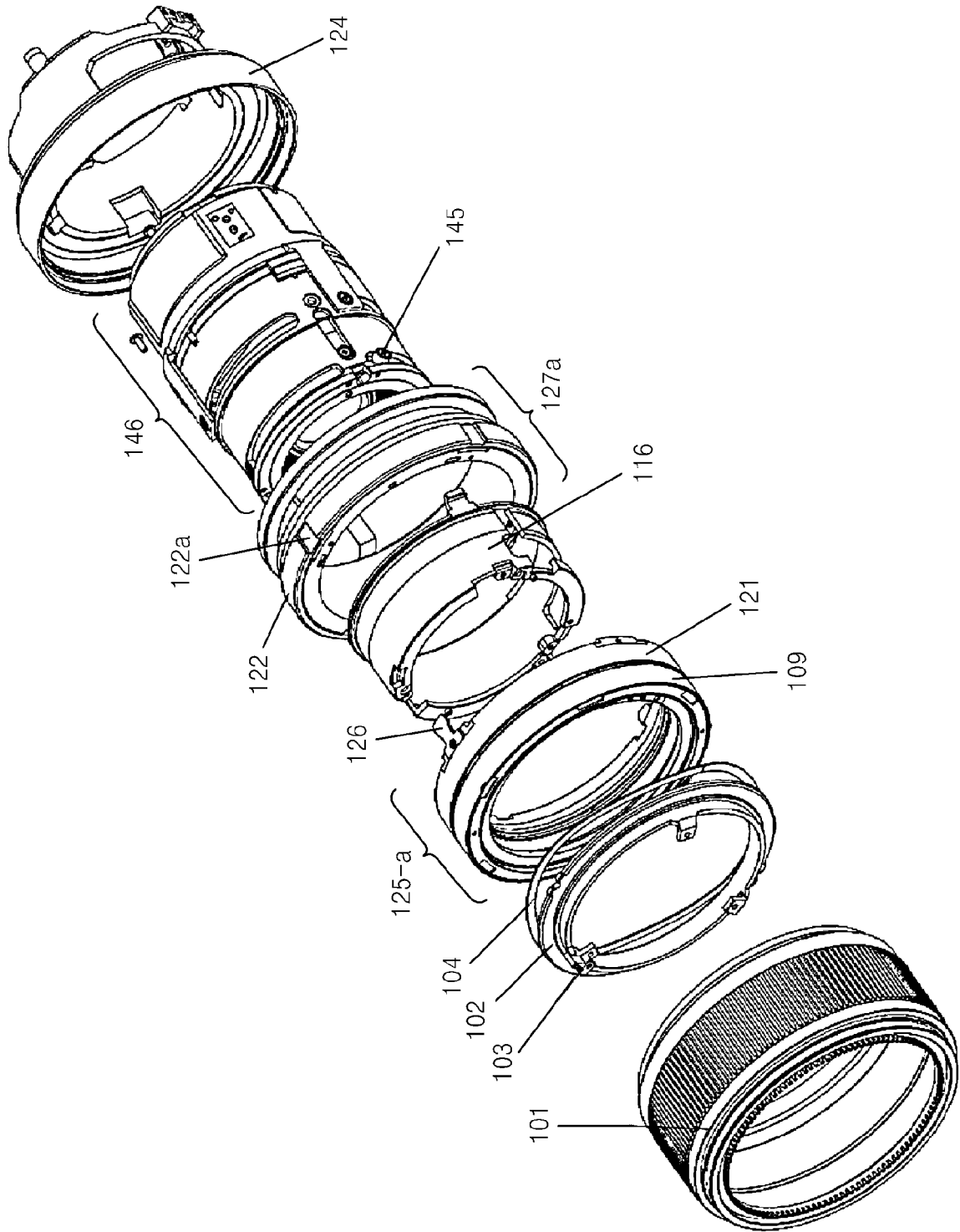
FIG. 5 is a schematic exploded perspective view illustrating components of a device for transferring an optical element, according to another embodiment of the invention.
Figure 6:
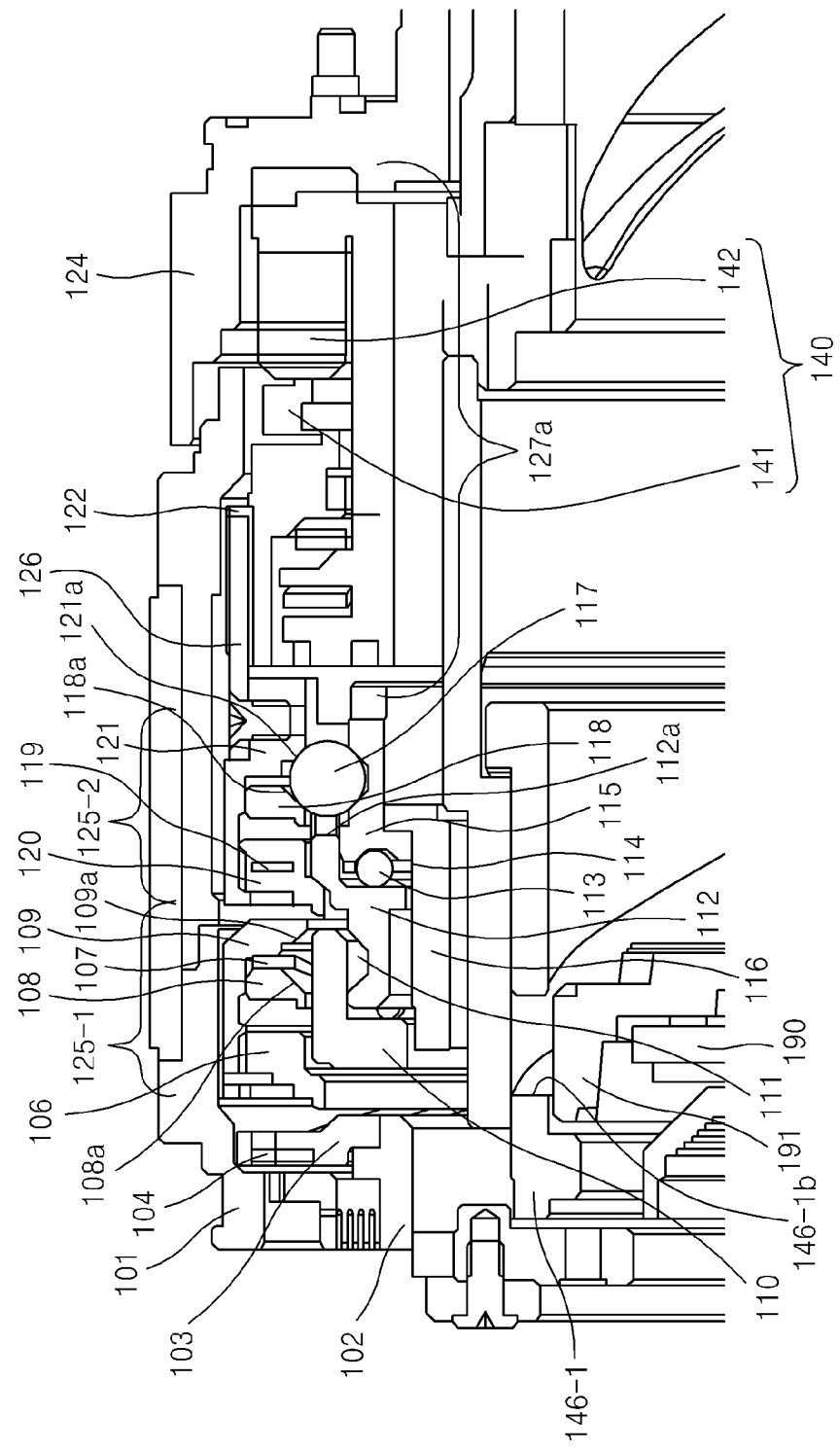
FIG. 6 is an assembled side cross-sectional view of a portion of the device of FIG. 5.

FIG. 5 is a schematic exploded perspective view illustrating components of a device for transferring an optical element 190, according to another embodiment of the invention. FIG. 6 is an assembled side cross-sectional view of a portion of the device of FIG. 5.

Referring to FIGS. 5 and 6, the device for transferring the optical element 190, according to the present embodiment, includes a housing 124, a driving element 140 that is installed in the housing 124 and generates a driving force, a differential transmitter 125-1 that is driven by the driving element 140 and transmits power, a manual manipulation ring 101 rotating due to manual manipulation and transmitting a rotation force to some components of the differential transmitter 125-1, a moving portion 191 that supports the optical element 190 and is disposed in the housing 124 so as to move along the direction of an optical axis, and a cam 146-1 having a cam groove 146-1b connected with the moving portion 191.

A driving unit 127a including the driving element 140 is disposed in front of the housing 124. The driving unit 127a also includes an output ring 122 rotating in a circumferential direction and the driving element 140 rotating the output ring 122. The driving element 140 includes a stator 142 producing repeated vibrations upon application of an electrical signal, and a rotor 141 that is deformed by the stator 142 and transmits a force.

When the output ring 122 rotates due to a driving force generated by the driving unit 127a, the driving force is transmitted to a power transmission unit 125-a through a linker 126 engaged in a groove 122a formed in a circumferential surface of the output ring 122. The power transmission unit 125-a includes the differential transmitter 125-1 and a power input portion 125-2.

The power input portion 125-2 decelerates a driving force received from the driving unit 127a by one half and transmits the resulting driving force to the differential transmitter 125-1. The differential transmitter 125-1 then decelerates the driving force received from the power input portion 125-2 by one half and rotates the cam 146-1. The differential transmitter 125-1 also transmits a rotation force, generated as the manual manipulation ring 101 rotates, to the cam 146-1.

Figure 7:
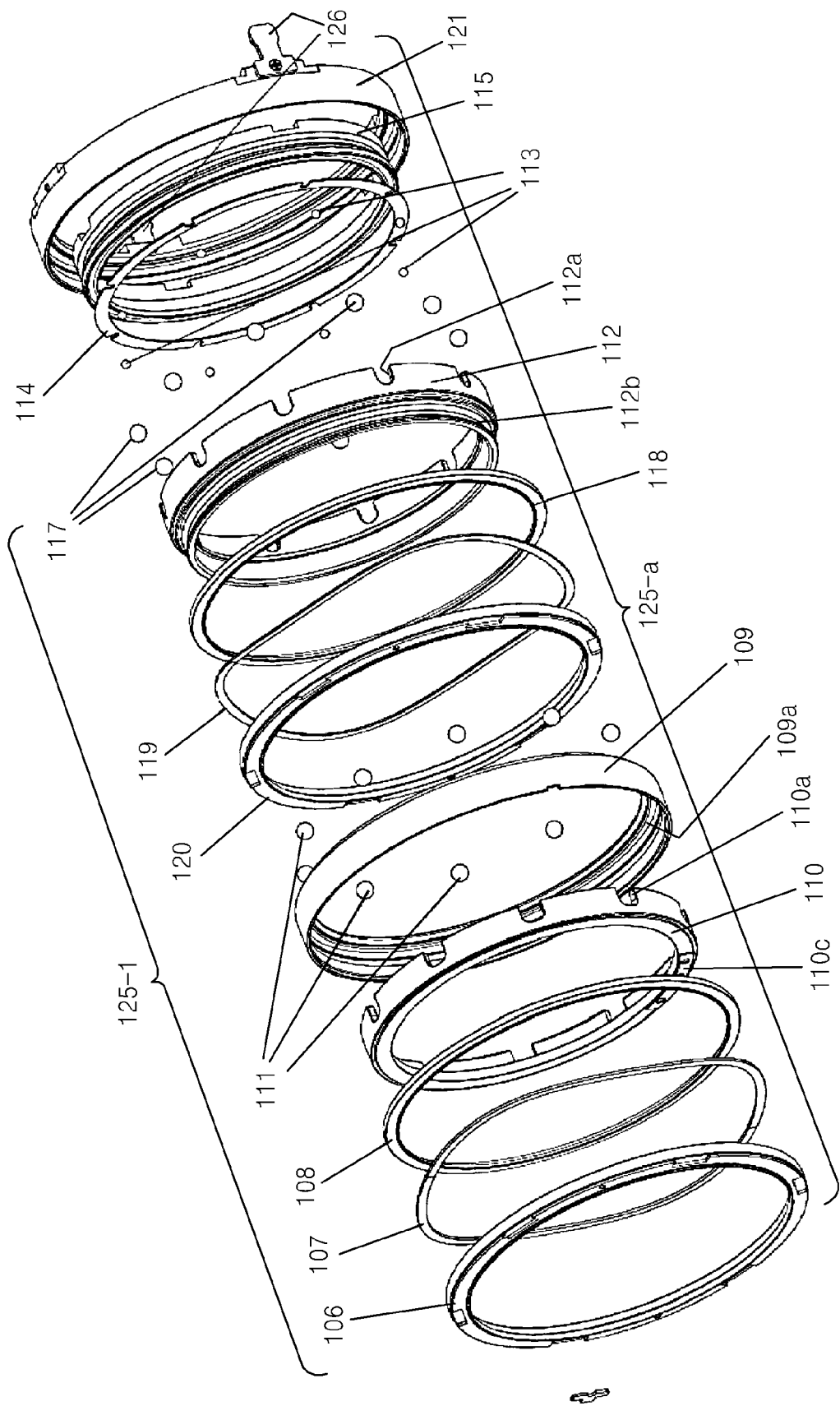
FIG. 7 is an exploded perspective view of some components of the device of FIG. 5.

FIG. 7 is an exploded perspective view of some components of the device of FIG. 5. Referring to FIG. 7, the differential transmitter 125-1 is disposed in a front side of the power transmission unit 125-a and includes an intermediate ring 110, first decelerating members 111 rotatably fitted in openings 110a of the intermediate ring 110, a first transmitting ring 112 disposed inside the intermediate ring 110 so as to contact the first decelerating members 111, and a second transmitting ring 109 disposed outside the intermediate ring 110 so as to contact the first decelerating members 111. The first transmitting ring 112, the second transmitting ring 109, and the intermediate ring 110 in the differential transmitter 125-1 are rotatably engaged with an outer circumferential surface of an inner frame 116 fixed with respect to the housing 124.

The intermediate ring 110 is cylindrical and includes a plurality of separate openings 110a formed along the circumference thereof. The first decelerating members 111 are rotatably inserted into each of the plurality of openings 110a of the intermediate ring 110. The intermediate ring 110 and the first decelerating members 111 decelerate a force generated due to rotation of the first or second transmitting ring 112 or 109 by one half and transmit the resulting force to the cam 146-1.

Figure 8:
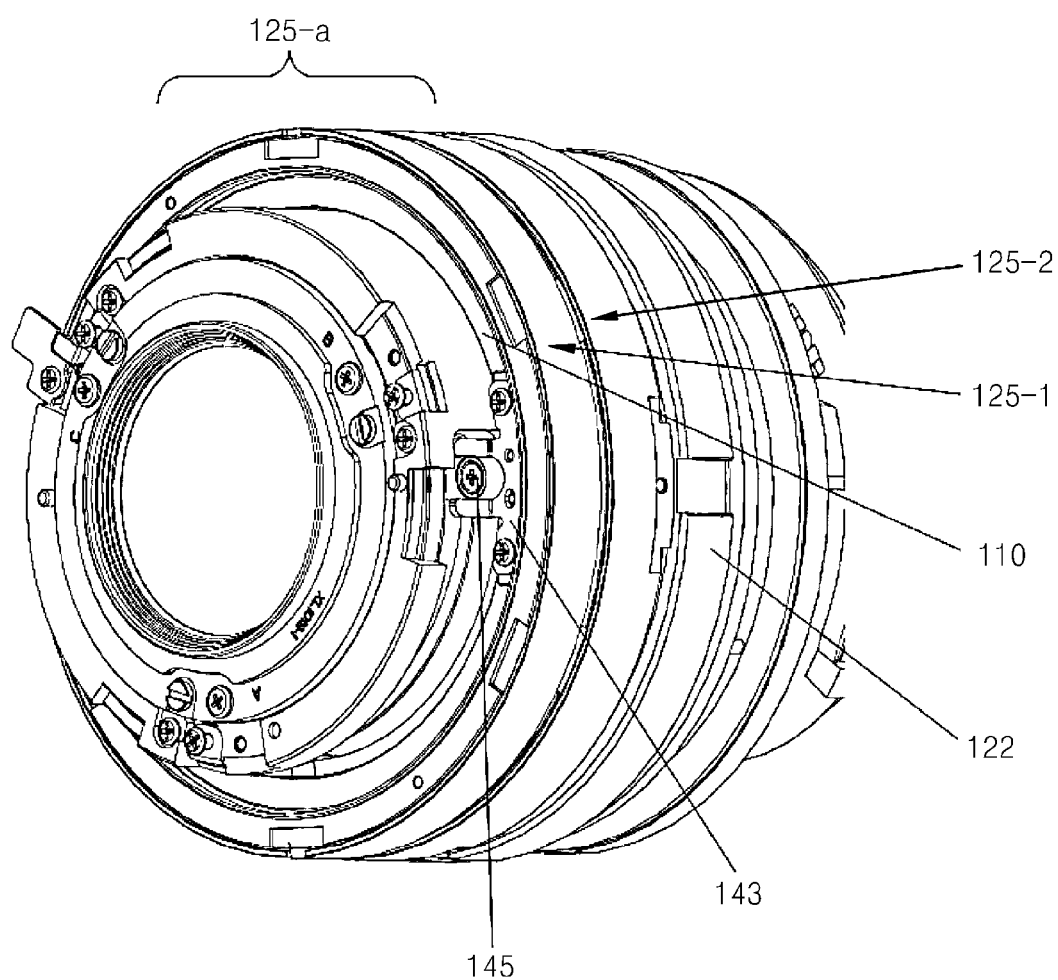
FIG. 8 is an assembled perspective view of some components of the device of FIG. 5.

FIG. 8 is an assembled perspective view of some components of the device of FIG. 5. Referring to FIG. 8, because a connecting member 143 fixed to a fixing region 110c on a front side of the intermediate ring 110 is engaged with a guide roller 145 projecting out from the cam 146-1, the cam 146-1 rotates when the intermediate ring 110 rotates.

The first transmitting ring 112 is disposed inside the intermediate ring 110 so as to contact the first decelerating members 111 and rotate with respect to the intermediate ring 110 and transmits a driving force received from the driving element 140 to the intermediate ring 110. Referring to FIG. 7, the first transmitting ring 112 has a support surface 112b extending in the circumferential direction so as to rotatably support the first decelerating members 111.

Referring to FIGS. 6 and 7, the first transmitting ring 112 has a hollow cylindrical shape and includes a plurality of second openings 112a separated along the circumference thereof. Second decelerating members 117 are rotatably inserted into each of the plurality of second openings 112a in the intermediate ring 110. An input ring 121 contacts the second decelerating members 117 and rotates with respect to the first transmitting ring 112 due to the driving element 140. The input ring 121, the second decelerating members 117, the first transmitting ring 112 having the above-described construction decelerate a rotation force of the output ring 122 generated by the driving element 140 by one half and transmits the resulting rotation force to the intermediate ring 110.

The second transmitting ring 109 is disposed outside of the intermediate ring 110 so as to contact the first decelerating members 111 and rotate with respect to the intermediate ring 110 and transmits a rotation force received from the manual manipulation ring 101 to the intermediate ring 110. Because the second transmitting ring 109 remains in contact with the manual manipulation ring 101, a rotation force generated by the rotation of the manual manipulation ring 101 may be transmitted to the second transmitting ring 109 in order to rotate the second transmitting ring 109.

The second transmitting ring 109 has a first contact surface 109a extending in a circumferential direction so as to contact one surface of the first decelerating members 111. The differential transmitter 125-1 further includes a first retainer 108 disposed in front of the second transmitting ring 109 and having a second contact surface 108a extending in the circumferential direction so as to contact the other surface of the first decelerating members 111, a cover ring 106 disposed in front of the first retainer 108 and combined with an end of the second transmitting ring 109, and a first elastic ring 107 applying an elastic force to the cover ring 106 and the first retainer 108.

The differential transmitter 125-1 having the above-described construction is realized as a single module. A force generated when the first retainer 108 and the second transmitting ring 109 apply a predetermined pressure to contact with the first decelerating members 111 may be set within the differential transmitter 125-1 by the first elastic ring 107 disposed inside the cover ring 106. Because the first elastic ring 107 is positioned inside the cover ring 106, the pressure set within the differential transmitter 125-1 does not affect other components outside the differential transmitter 125-1.

A second elastic ring 104 that applies an elastic force, an external retainer 102, and a friction maintaining ring 103 are disposed between the manual manipulation ring 101 and the cover ring 106 so as to provide an elastic force and generate a frictional force between the manual manipulation ring 101 and the cover ring 106.

Due to the operation of the second elastic ring 104, the external retainer 102, and the friction maintaining ring 103, an inertial force generated by the manual manipulation ring 101 acts on the second transmitting ring 109. Thus, the second transmitting ring 109 remains stationary while the first transmitting ring 112 rotates due to the driving element 140. That is, in order to maintain the stationary state of the second transmitting ring 109 while the first transmitting ring 112 rotates due to the driving element 140, a frictional force set between the manual manipulation ring 101 and the housing 124 may be greater than a driving force generated by the driving element 140 and transmitted through the first decelerating members 111 and the second transmitting ring 109.

Referring to FIGS. 6 and 7, the power input portion 125-2 is disposed in a rear side of the power transmission unit 125-*a* and includes the second decelerating members 117 that are rotatably inserted into each of the plurality of separate second openings 112*a* formed on the circumferential surface in the circumferential direction and the input ring 121 contacting the second decelerating members 117 and rotating with respect to the first transmitting ring 112 due to the driving element 140.

Because the input ring 121 is connected to the output ring 122 of the driving unit 127*a* by the linker 126 so that they rotate together, the input ring 121 rotates as the driving element 140 operates.

The input ring 121 has a first contact surface 121*a* extending in a circumferential direction so as to contact one surface of the second decelerating members 117. The power transmission unit 125-*a* also includes a second retainer 118 that is disposed in front of the input ring 121 and has a second contact surface 118*a* corresponding to the first contact surface 121*a* and extending in a circumferential direction so as to contact the other surface of the second decelerating members 117

The power transmission unit 125-*a* further includes a cover ring 120 disposed in front of the second retainer 118 and combined with an end of the input ring 121 and a third elastic ring 119 disposed between the cover ring 120 and the second retainer 118 and applying an elastic force. The third elastic ring 119 serves to maintain an internal set pressure of the power input portion 125-2 within the cover ring 120 and enables a stable frictional contact among the second decelerating members 117, the second retainer 118, and the input ring 121.

The second decelerating members 117 are movably supported in a circumferential direction along a stationary ring 115 fixed to the housing 124. Support members 113 and a rotary plate 114 are disposed between the front side of the stationary ring 115 and the first transmitting ring 112. The rotary plate 114 rotatably supports the support members 113 and is rotatably disposed around the optical axis with respect to the stationary ring 115. The support members 113 rotatably support the first transmitting ring 112 with respect to the housing 124.

Referring to FIG. 5, an optical system 146 is disposed in front of the housing 124 and has optical elements such as lenses. The driving unit 127*a*, the power transmission unit 125-*a*, and the manual manipulation ring 101 are arranged outside of the optical system 146. The cam 146-1 is disposed rotatably around the optical axis within the optical system 146.

Referring to FIGS. 5 and 8, the cam 146-1 has the outwardly projecting guide roller 145 connected to the intermediate ring 110 by the connecting member 143. Thus, when the intermediate ring 110 rotates, the cam 146-1 rotates, which causes the moving portion 191 supporting the optical element 190 to move along the optical axis.

The device for transferring the optical element 190 having the above-described construction allows a user to rotate the manual manipulation ring 101 without using a special transition switch, thereby enabling consecutive fine tuning and adjustment of the position of the optical element 190.

Furthermore, when a user does not operate the manual manipulation ring 101, the position of the optical element 190 may be adjusted by applying a control signal to the driving element 140.

When the automatic adjusting mode is performed, a control signal applied to the driving element 140 causes the input ring 121 to rotate due to the driving element 140. A driving force decelerated by one half as it passes through the second decelerating members 117 is transmitted to the first transmitting ring 112. That is, when the rotation velocity of the input ring 121 is V, the first transmitting ring 112 rotates at velocity V/2, which is one half of the rotation velocity V.

When the first transmitting ring 112 rotates, a rotation force of the first transmitting ring 112 is transmitted to the first decelerating members 111 in frictional contact with the first transmitting ring 112.

The rotation force is also transmitted to the intermediate ring 110 with the first decelerating members 111 inserted thereinto. In this case, because the second transmitting ring 109 maintains frictional contact with the manual manipulation ring 101 that remains stationary, the second transmitting ring 109 and the first retainer 108 maintain a stationary state while the first decelerating members 111 are rotating.

Although a driving force generated by the driving element 140 is transmitted to the second transmitting ring 109 through the first transmitting ring 112 and the first decelerating members 111, the second transmitting ring 109 does not rotate because the driving force is set less than a force needed to rotate the manual manipulation ring 101.

Because a driving force generated by the driving element 140 is transmitted to the first transmitting ring 112 and the first decelerating members 111 when the second transmitting ring 109 is kept stationary, the first decelerating members 111 perform a rolling motion along the second transmitting ring 109. When the rotation velocity of the first transmitting ring 112 is V/2, the intermediate ring 110 and the cam 146-1 rotate at velocity V/4 that is one half of the rotation velocity V/2 of the first transmitting ring 112.

When the driving element 140 operates as described above, the position of the optical element 190 can be automatically adjusted. Furthermore, because the driving force generated by the driving element 140 is decelerated to one quarter of the rotation velocity V before being transmitted to the cam 146-1, the device for transferring the optical element 190 allows fine tuning of the position of the optical element 190.

When a user rotates the manual manipulation ring 101, the manual adjusting mode may be performed to manually fine tune the position of the optical element 190. When the manual manipulation ring 101 rotates due to the user's manipulation, the second transmitting ring 109 rotates together with the manual manipulation ring 101.

Although electricity is not applied to the driving element 140 while the user operates the manual manipulation ring 101, the output ring 122 maintains a stationary state due to a static friction force acting on the driving element 140. The static friction force refers to a force acting between the stator 142 and the rotor 141 of the driving element 140.

When the output ring 122 ceases to move, the input ring 121 and the first transmitting ring 112 connected to the output ring 122 maintain a stationary state. Thus, the first decelerating members 111 perform a rolling motion along the second transmitting ring 109. This, in turn, causes the intermediate ring 110 and the cam 146-1 to rotate together due to the rotation of the manual manipulation ring 101, thereby enabling adjustment of the position of the optical element 190.

Figure 9:
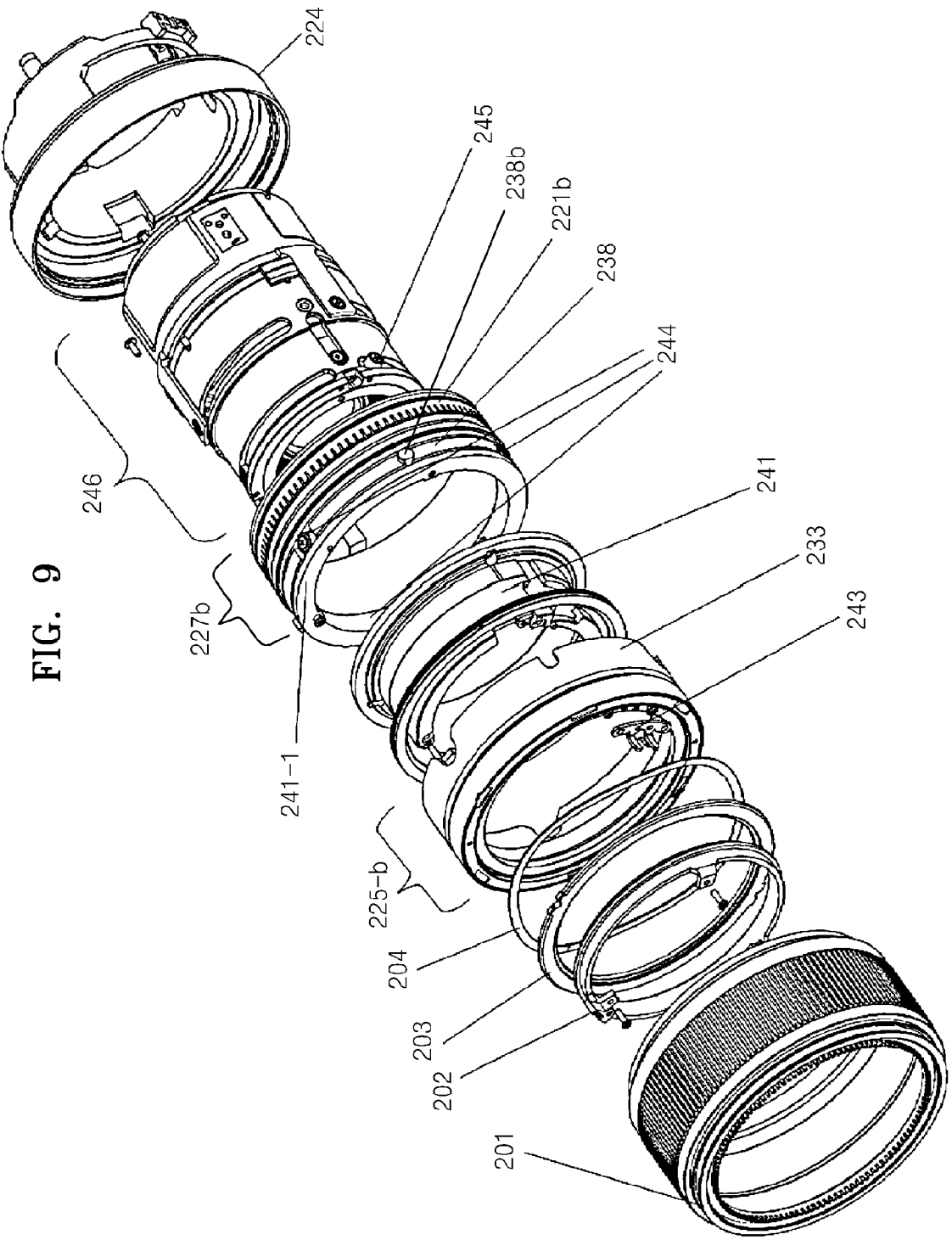
FIG. 9 is a schematic exploded perspective view illustrating components of a device for transferring an optical element, according to yet another embodiment of the invention.
Figure 10:
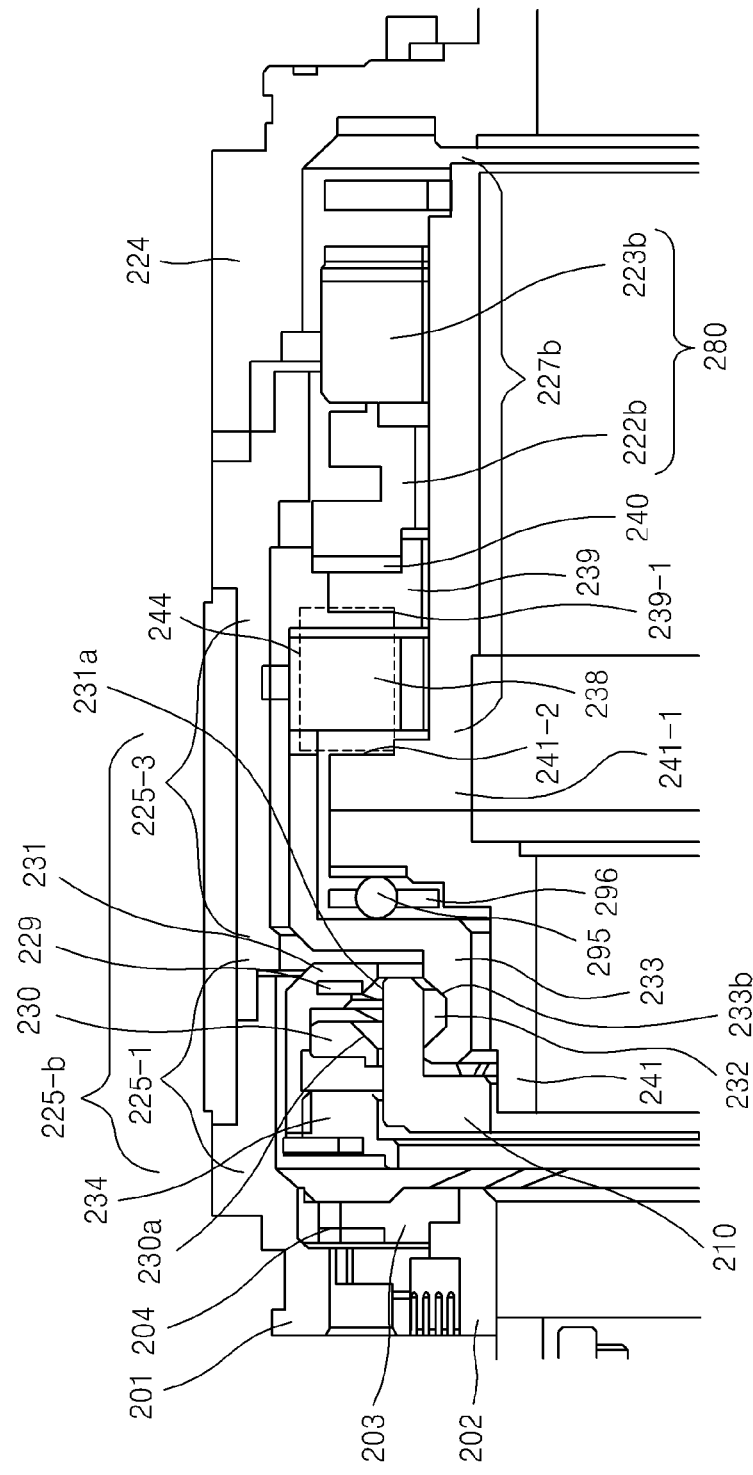
FIG. 10 is an assembled side cross-sectional view of a portion of the device of FIG. 9.

The device for transferring the optical element 190, according to the present embodiment, allows a user to perform the manual adjusting mode without a separate manipulation to switch a mode. Furthermore, the driving force received from the driving element 140 is decelerated to one quarter as it passes through the power input portion 125-2 and the differential transmitter 125-1 while a rotation force generated by the rotation of the manual manipulation ring 101 is decelerated to one half as it passes only through the differential transmitter 125-1 before being transmitted to the cam 146-1. This eliminates user inconvenience to rotate the manual manipulation ring 101 over a wide angular range in a manual adjusting mode FIG. 9 is a schematic exploded perspective view illustrating components of a device for transferring an optical element, according to yet another embodiment of the invention. FIG. 10 is an assembled side cross-sectional view of a portion of the device of FIG. 9.

The device for transferring an optical element, according to the present embodiment, has a similar construction to the device described with reference to FIGS. 5 through 8 except for the construction of a power input portion 225-3.

Referring to FIGS. 9 and 10, the device for transferring an optical element, according to the present embodiment, includes a housing 224, a driving element 280 that is installed in the housing 224 and generates a driving force, a differential transmitter 225-1 that is driven by the driving element 280 and transmits power, a manual manipulation ring 201 rotating due to manual manipulation and transmitting a rotation force to some components in the differential transmitter 225-1, a moving portion (not shown) that supports an optical element (not shown) and is disposed in the housing 224 so as to move along the direction of an optical axis, and a cam (not shown) having a cam groove (not shown) connecting with the moving portion.

Because the moving portion and the cam having the cam groove are connected to the differential transmitter 225-1 similar to the embodiment described with reference to FIGS. 5 through 8, a detailed description of the construction is not repeated here.

A driving unit 227b including the driving element 280 is disposed in front of the housing 224. The driving unit 227b also includes an input ring 239 rotating in a circumferential direction and the driving element 280 rotating the input ring 239. The driving element 280 includes a stator 223b producing repeated vibrations upon application of an electrical signal, and a rotor 222b that is deformed by the stator 223b and transmits a force. A buffer member 240 is disposed between the rotor 222b and the input ring 239.

The driving unit 227b further includes a support ring 238 that is rotatably disposed in front of the input ring 239 and has a plurality of separate third openings 239-1 formed in a circumferential direction and contacting the input ring 239 and rollers 244 rotatably combined with the third openings 239-1 of the support ring 238.

The third openings 239-1 are formed at positions of the support ring 238 that contact the input ring 239. The rollers 244 are in contact with the input ring 239 through the third openings 239-1 so they rotate as the input ring 239 rotates. The rollers 244 may rotate around a radial axial line from the center of the support ring 238.

The input ring 239 and the support ring 238 are supported so that they can move in a circumferential direction along a stationary ring 241-1 fixed to the housing 224. Because the rollers 244 have one side contacting the input ring 239 through the third openings 239-1 and the other side contacting a surface 241-2 of the stationary ring 241-1, the rollers 244 may perform a rolling motion along the stationary ring 241-1. Thus, when the input ring 239 rotates, a driving force decelerated by one half is transmitted to the spring 238.

The power input portion 225-3 decelerates a driving force generated by the driving unit 280 by one half due to the operation of the support ring 238 and the rollers 244 and transmits the resulting driving force to the differential transmitter 225-1.

The device further includes a support member 295 and a rotary plate 296 disposed between an inner frame 241 disposed on a front of the stationary ring 241-1 and a first transmitting ring 233. The rotary plate 296 rotatably supports the support member 295 and is rotatably disposed around the optical axis with respect to the stationary ring 241-1. The support member 295 rotatably supports the first transmitting ring 233 with respect to the housing 224.

A power transmission unit 225-b is disposed in front of the driving unit 227b and includes the power input portion 225-3 and the differential transmitter 225-1. The power input portion 225-3 decelerates a driving force received from the driving unit 227b by one half and transmits the resulting driving force to the differential transmitter 225-1. The differential transmitter 225-1 then decelerates the driving force received from the power input portion 225-3 by one half and rotates the cam. The differential transmitter 225-1 also transmits a rotation force, generated as the manual manipulation ring 201 rotates, to the cam.

Figure 11:
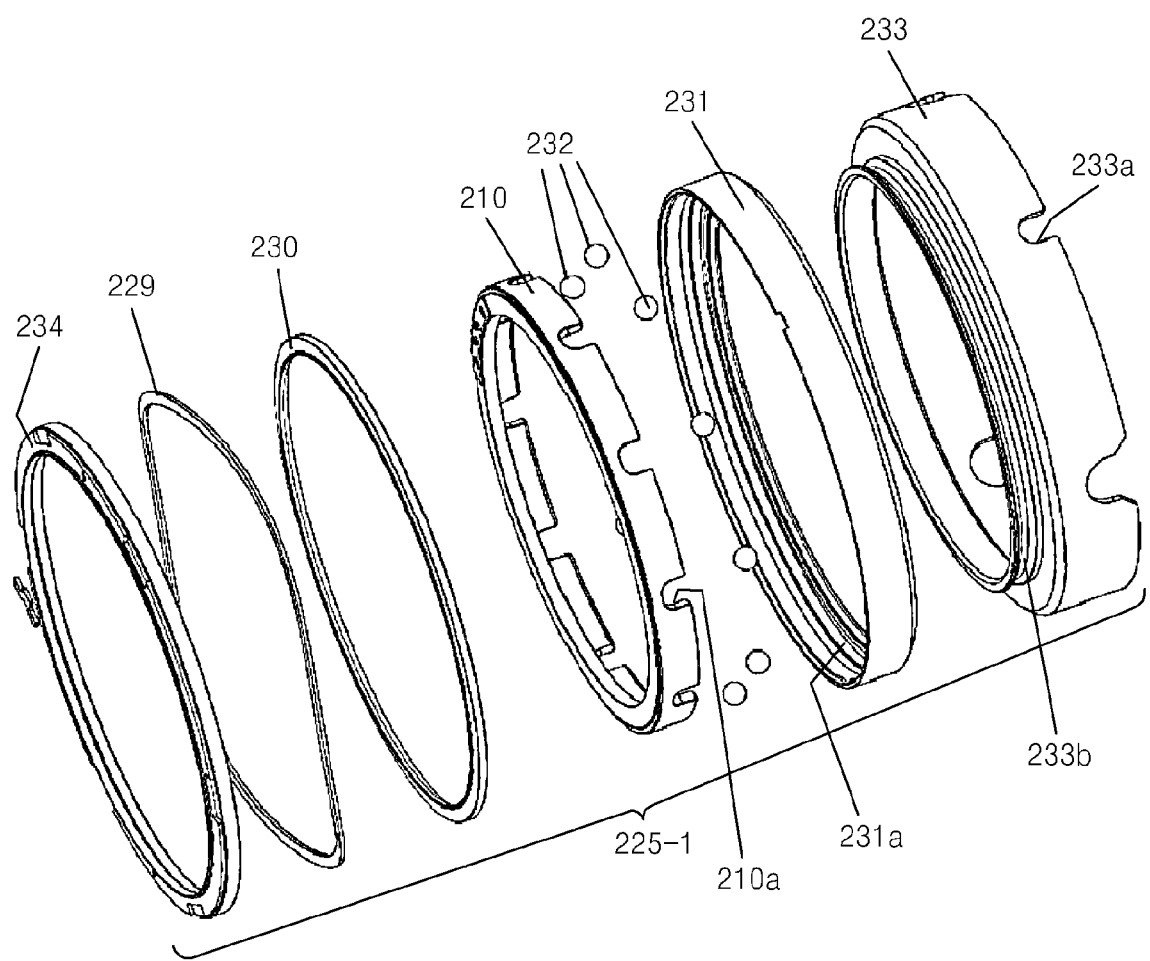
FIG. 11 is an exploded perspective view of some components of the device of FIG. 9.

FIG. 11 is an exploded perspective view of some components of the device of FIG. 9. Referring to FIG. 11, the differential transmitter 225-1 is disposed in a front side of the power transmission unit 225-b and includes an intermediate ring 210, first decelerating members 232 rotatably fitted in first openings 210a of the intermediate ring 210, a first transmitting ring 233 disposed inside the intermediate ring 210 so as to contact the first decelerating members 232, and a second transmitting ring 231 disposed outside the intermediate ring 210 so as to contact the first decelerating members 232. The first transmitting ring 233, the second transmitting ring 231, and the intermediate ring 210 in the differential transmitter 225-1 are rotatably engaged with an outer circumferential surface of an inner frame 241 fixed with respect to the housing 224.

The intermediate ring 210 is cylindrical and includes the plurality of separate first openings 210a formed along the circumference thereof. The first decelerating members 232 are rotatably inserted into each of the plurality of first openings 210a of the intermediate ring 110. The intermediate ring 210 and the first decelerating members 232 decelerate a force generated due to rotation of the first or second transmitting ring 233 or 231 by one half and transmit the resulting force to the cam.

Figure 12:
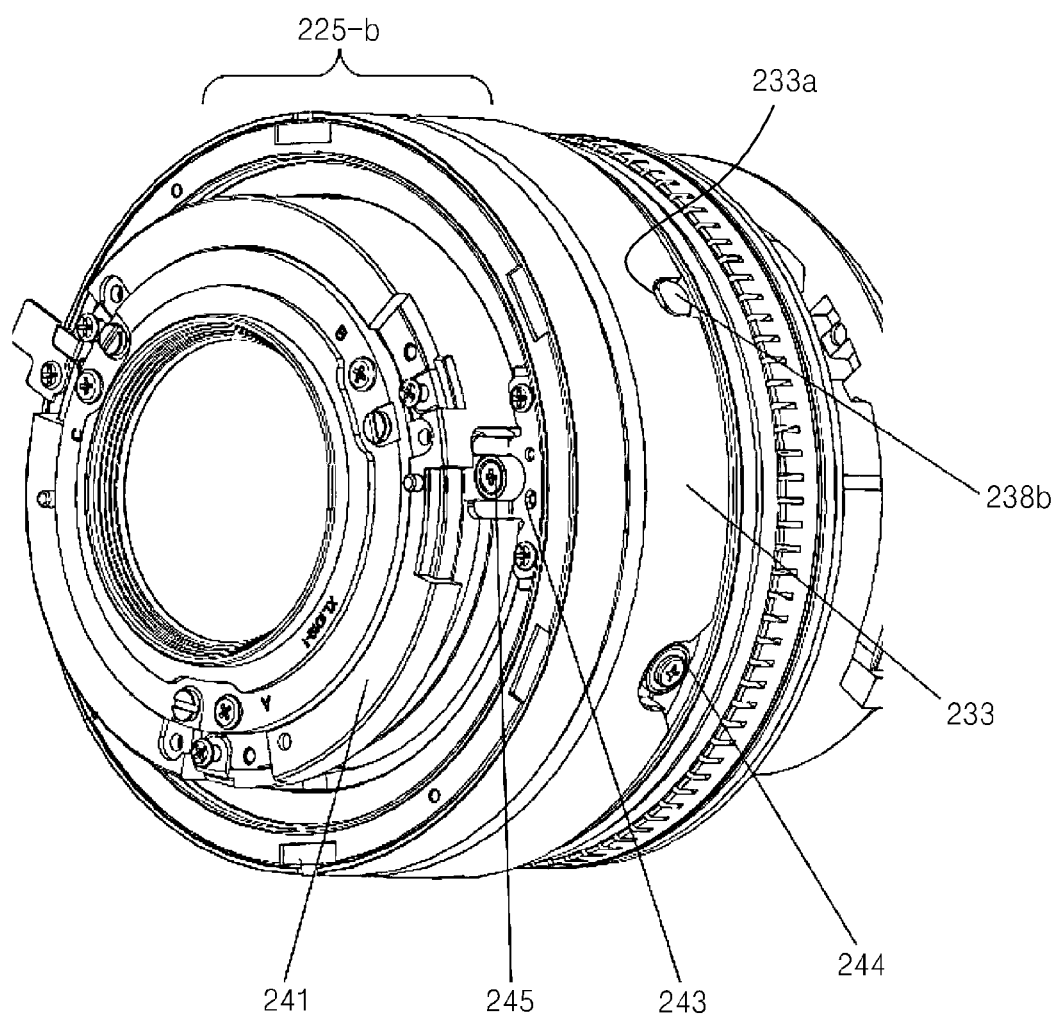
FIG. 12 is an assembled perspective view of some components of the device of FIG. 9.

FIG. 12 is an assembled perspective view of some components of the device of FIG. 9. Referring to FIG. 12, because a connecting member 243 fixed on a front side of the intermediate ring 210 is engaged with a guide roller 245 projecting out from the cam, the cam rotates when the intermediate ring 210 rotates.

The first transmitting ring 233 has a contact surface 233b contacting the first decelerating members 232 and is disposed inside the intermediate ring 210 so that it is rotatable with respect to the intermediate ring 210.

Referring to FIGS. 10 and 11, the first transmitting ring 233 has a hollow cylindrical shape and includes a plurality of second openings 233a separated along the circumference thereof. Referring to FIG. 12, projections 238b projecting out from the support ring 238 engages with each of the second openings 233a. Thus, as the support ring 238 rotates, the first transmitting ring 233 rotates together with the support ring 238.

The second transmitting ring 231 is disposed outside of the intermediate ring 210 so as to contact the first decelerating members 232 and rotate with respect to the intermediate ring 210 and transmits a rotation force received from the manual manipulation ring 201 to the intermediate ring 210. Because the second transmitting ring 231 remains in contact with the manual manipulation ring 201, a rotation force generated by the rotation of the manual manipulation ring 201 may be transmitted to the second transmitting ring 231 in order to rotate the second transmitting ring 231.

The second transmitting ring 231 has a first contact surface 231a extending in a circumferential direction so as to contact one surface of the first decelerating members 232. The differential transmitter 225-1 further includes a first retainer 230 disposed in front of the second transmitting ring 231 and having a second contact surface 230a extending in a circumferential direction so as to contact the other surfaces of the first decelerating members 232, a cover ring 234 disposed in front of the first retainer 230 and combined with an end of the second transmitting ring 231, and a first elastic ring 229 applying an elastic force to the cover ring 234 and the first retainer 230.

The differential transmitter 225-1 having the above-described construction is realized as a single module. A force generated when the first retainer 230 and the second transmitting ring 231 apply a predetermined pressure to contact with the first decelerating members 232 may be set within the differential transmitter 225-1 by the first elastic ring 229 disposed inside the cover ring 234. Because the first elastic ring 229 is positioned inside the cover ring 234, the pressure set within the differential transmitter 225-1 does not affect other components outside the differential transmitter 225-1.

A second elastic ring 204 applying an elastic force, an external retainer 202, and a friction maintaining ring 203 are disposed between the manual manipulation ring 201 and the cover ring 234 so as to provide an elastic force and generate a frictional force between the manual manipulation ring 201 and the cover ring 234.

Due to the operation of the second elastic ring 204, the external retainer 202, and the friction maintaining ring 203, an inertial force generated by the manual manipulation ring 201 acts on the second transmitting ring 231. Thus, the second transmitting ring 231 remains stationary while the first transmitting ring 233 rotates due to the driving element 280.

That is, in order to maintain the stationary state of the second transmitting ring 231 while the first transmitting ring 233 rotates due to the driving element 280, a frictional force set between the manual manipulation ring 201 and the housing 224 may be set to greater than a driving force generated by the driving element 280 and transmitted through the first decelerating members 232 and the second transmitting ring 231.

Referring to FIG. 9, an optical system 246 is disposed in front of the housing 224 and has optical elements such as lenses. The driving unit 227b, the power transmission unit 225-b, and the manual manipulation ring 201 are arranged outside of the optical system 246. The cam is disposed rotatably around the optical axis within the optical system 246.

Referring to FIG. 12, the cam has the outwardly projecting guide roller 245 connected to the intermediate ring 210 by the connecting member 243. Thus, when the intermediate ring 210 rotates, the cam rotates, which causes the moving portion supporting the optical element to move along the optical axis.

The device for transferring the optical element having the above-described construction allows a user to rotate the manual manipulation ring 201 without using a special transition switch, thereby enabling consecutive fine tuning and adjustment of the position of the optical element 190.

Furthermore, when a user does not operate the manual manipulation ring 201, the position of the optical element may be adjusted by applying a control signal to the driving element 140.

When the automatic adjusting mode is performed, a control signal applied to the driving element 280 causes the input ring 239 to rotate due to the driving element 280. A driving force decelerated by one half as it passes through the second decelerating members 244 is transmitted to the first transmitting ring 233. That is, when the rotation velocity of the input ring 239 is V, the first transmitting ring 233 rotates at velocity V/2.

When the first transmitting ring 233 rotates, a rotation force of the first transmitting ring 233 is transmitted to the first decelerating members 232 in frictional contact with the first transmitting ring 233.

The rotation force is also transmitted to the intermediate ring 210 with the first decelerating members 232 inserted thereinto. In this case, because the second transmitting ring 232 maintains frictional contact with the manual manipulation ring 201 that remains stationary, the second transmitting ring 231 and the first retainer 232 maintain a stationary state while the first decelerating members 111 are rotating.

Although a driving force generated by the driving element 280 is transmitted to the second transmitting ring 231 through the first transmitting ring 233 and the first decelerating members 232, the second transmitting ring 231 does not rotate because the driving force is set less than a force needed to rotate the manual manipulation ring 201.

Because a driving force generated by the driving element 280 is transmitted to the first transmitting ring 233 and the first decelerating members 232 when the second transmitting ring 231 is kept stationary, the first decelerating members 232 perform a rolling motion along the second transmitting ring 231. When the rotation velocity of the first transmitting ring 233 is V/2, the intermediate ring 210 and the cam rotate at velocity V/4, which is one half of the rotation velocity V/2 of the first transmitting ring 233.

When the driving element 280 operates as described above, the position of the optical element can be automatically adjusted. Furthermore, because the driving force generated by the driving element 280 is decelerated to one quarter of the rotation velocity V before being transmitted to the cam, the device for transferring the optical element allows fine tuning of the position of the optical element.

When a user rotates the manual manipulation ring 201, the manual adjusting mode may be performed to manually fine tune the position of the optical element. When the manual manipulation ring 201 rotates due to the user's manipulation, the second transmitting ring 231 rotates together with the manual manipulation ring 201.

Although electricity is not applied to the driving element 280 while the user manipulates the manual manipulation ring 201, the input ring 239 maintains a stationary state due to a static friction force acting on the driving element 280. The static friction force refers to a force acting between the stator 223b and the rotor 222b of the driving element 280.

When the input ring 239 ceases to move, because the first transmitting ring 233 connected to the input ring 239 maintains a stationary state, the first decelerating members 232 perform a rolling motion along the second transmitting ring 231. This, in turn, causes the intermediate ring 210 and the cam to rotate together due to the rotation of the manual manipulation ring 201, thereby enabling adjustment of the position of the optical element.

The device for transferring the optical element, according to the present embodiment, allows a user to perform the manual adjusting mode without a separate manipulation to switch a mode. Furthermore, the driving force received from the driving element 280 is decelerated to one quarter as it passes through the power input portion 225-3 and the differential transmitter 225-1 while a rotation force generated by the rotation of the manual manipulation ring 201 is decelerated to one half as it passes only through the differential transmitter 225-1 before being transmitted to the cam. This eliminates user inconvenience to rotate the manual manipulation ring 201 over a wide angular range in a manual adjusting mode.

Figure 13:
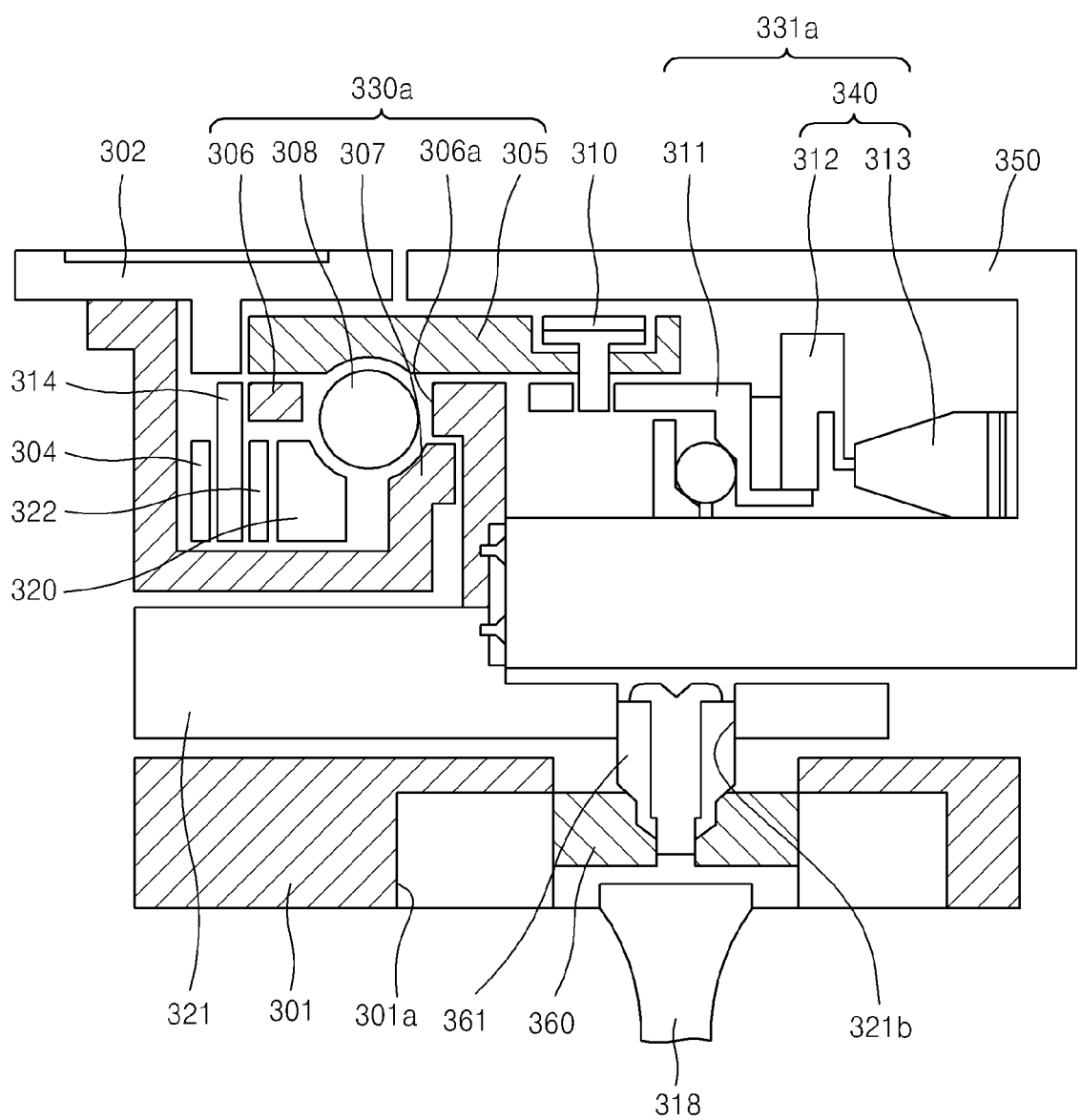
FIG. 13 is a schematic side cross-sectional view illustrating components of a device for transferring an optical element, according to still another embodiment of the invention.

FIG. 13 is a schematic side cross-sectional view illustrating components of a device for transferring an optical element 318, according to still another embodiment of the invention.

The device for transferring the optical element 318, according to the present embodiment, is similar in construction to the device for transferring an optical element described with reference to FIGS. 1 through 4 except for the positions of a differential transmitter 330a, a first transmitting ring 305, and a second transmitting ring 307.

Referring to FIG. 13, the device for transferring the optical element 318, according to the present embodiment, includes a housing 350, a driving element 340 that is installed in the housing 350 and generates a driving force, the differential transmitter 330a that is driven by the driving element 340 and transmits power, a manual manipulation ring 302 rotating due to manual manipulation and transmitting a rotation force to some components in the differential transmitter 330a, a moving portion 360 that supports the optical element 318 and is disposed in the housing 350 so as to move along the direction of an optical axis, and a cam 321 having a cam groove 321b connecting with the moving portion 360.

A driving unit 331a including the driving element 340 is disposed in front of the housing 350. The differential transmitter 330a transmits the driving force, generated by the driving unit 331a or generated when the manual manipulation ring 302 rotates to the cam 321.

The driving unit 331a includes the driving element 340, an input ring 311 rotating due to a driving force generated by the driving element 340, and an engaging member 310 projecting outward with respect to the input ring 311. In the present embodiment, the driving element 340 includes a stator 313 producing repeated vibrations upon application of an electrical signal, and a rotor 312 that is deformed by the stator 313 and transmits a force.

The input ring 311 is disposed in front of the rotor 312 and is rotatably mounted with respect to the housing 350. The input ring 311 engages with the first transmitting ring 305 with the engaging member 310 interposed therebetween.

A fixed lens barrel 301 is attached to the housing 350. The fixed lens barrel 301 has a linear groove 301a extending in the direction of the optical axis and remains fixed to the housing 350.

The moving portion 360 is disposed inside the fixed lens barrel 301 so as to support the optical element 318 and move in the direction of the optical axis. The moving portion 360 has a cam protrusion 361 projecting outward to fit into the linear groove 301a of the fixed lens barrel 301.

The cam 321 is disposed outside the fixed lens barrel 301. The cam 321 has a cam groove 321b in which the cam protrusion 361 is inserted so is rotatably mounted with respect to the fixed lens barrel 301. As the cam 321 rotates with respect to the fixed lens barrel 301, the cam protrusion 361 engaging with the cam groove 321b is guided by the cam groove 321b so that the moving portion 360 can move within the fixed lens barrel 301.

The differential transmitter 330a includes an intermediate ring 306, first decelerating members 308 rotatably fitted in each of a plurality of openings 306a in the intermediate ring 306, the first transmitting ring 305 disposed inside the intermediate ring 306 so as to contact the first decelerating members 308, and a second transmitting ring 307 disposed outside the intermediate ring 306 so as to contact the first decelerating members 308.

Each of the intermediate ring 306, first transmitting ring 305, and second transmitting ring 307 is rotatably disposed around the optical axis with respect to the housing 350. Because each of the first and second transmitting rings 305 and 307 are rotatable with respect to the intermediate ring 306, the intermediate ring 306 rotates as the first or second transmitting ring 305 or 307 rotates.

The intermediate ring 306 is cylindrical and includes the plurality of separate openings 306a formed along the circumference thereof. The first decelerating members 308 are rotatably inserted into each of the plurality of openings 306a of the intermediate ring 306. The intermediate ring 306 and the first decelerating members 308 decelerate a force generated due to rotation of the first or second transmitting ring 305 or 307 by one half and transmit the resulting force to the cam 321.

The first transmitting ring 305 is disposed inside the intermediate ring 306 so as to contact the first decelerating members 308 and rotate with respect to the intermediate ring 306 and transmits a driving force received from the driving element 340 to the intermediate ring 306. A rear end of the first transmitting ring 305 engages with the engaging member 310 of the driving unit 331a. In this way, the first transmitting ring 305 is connected to the input ring 311 rotating due to the driving element 340 by the engaging member 310. Thus, a driving force generated by the driving element 340 is delivered to the first transmitting ring 305 via the input ring 311.

The second transmitting ring 307 is disposed outside of the intermediate ring 306 so as to contact the first decelerating members 308 and rotate with respect to the intermediate ring 306 and transmits a rotation force received from the manual manipulation ring 302 to the intermediate ring 306. Because the second transmitting ring 307 remains in contact with the manual manipulation ring 302, a rotation force generated by the rotation of the manual manipulation ring 302 may be transmitted to the second transmitting ring 307 in order to rotate the second transmitting ring 307.

The second transmitting ring 307 is in contact with first surfaces of the first decelerating members 308. The differential transmitter 330a further includes a first retainer 320 disposed in front of the second transmitting ring 307 and contacting other surfaces of the first decelerating members 308 facing the one surface of the second transmitting ring 307, a cover ring 314 disposed in front of the first retainer 320 and combined with an end of the second transmitting ring 307, and a first elastic ring 322 disposed between the cover ring 314 and the first retainer 320 and applying an elastic force.

The differential transmitter 330a having the above-described construction is realized as a single module. A force generated when the first retainer 320 and the second transmitting ring 307 apply a predetermined pressure to contact with the first decelerating members 308 may be set within the differential transmitter 330a by the first elastic ring 322 disposed inside the cover ring 314.

A second elastic ring 304 is disposed between a portion of the second transmitting ring 307 connected to the manual manipulation ring 302 and the cover ring 314. The second elastic ring 304 applies an elastic force between the cover ring 314 and the manual manipulation ring 302 in order to generate a frictional force.

Due to the operation of the second elastic ring 304, an inertial force generated by the manual manipulation ring 302 is exerted on the second transmitting ring 307. Thus, the second transmitting ring 307 remains stationary while the first transmitting ring 305 rotates due to the driving element 340.

That is, in order to maintain the stationary state of the second transmitting ring 307 while the first transmitting ring 305 rotates due to the driving element 340, a frictional force set between the manual manipulation ring 302 and the housing 350 may be greater than a driving force generated by the driving element 340 and transmitted through the first decelerating members 308 and the first transmitting ring 305.

When the user rotates the manual manipulation ring 302, the second transmitting ring 307 rotates due to friction acting among the manual manipulation ring 302, the cover ring 314, and the second transmitting ring 307. While the second transmitting ring 307 rotates due to the manual manipulation ring 302, the first transmitting ring 305 may maintain a stationary state. To achieve this, a rotation force that is delivered to the driving element 340 through the first decelerating members 308 and the second transmitting ring 307 by rotating the manual manipulation ring 302 due to manual manipulation is set less than a static friction force acting on the driving element 340.

The device for transferring the optical element 318 having the above-described construction allows a user to rotate the manual manipulation ring 302 without manipulating a special transition switch, thereby enabling consecutive fine tuning and adjustment of the position of the optical element 318.

Furthermore, when the user does not manipulate the manual manipulation ring 302, an automatic adjusting mode may be performed to adjust the position of the optical element 318 by applying a control signal to the driving element 340.

When the automatic adjusting mode is executed, a control signal applied to the driving element 340 causes the input ring 311 and the first transmitting ring 305 coupled to the input ring 311 to rotate together. A rotation force of the first transmitting ring 305 is then transmitted to the first decelerating members 308 frictionally contacting the first transmitting ring 305.

The rotation force is also transmitted to the intermediate ring 306 having the first decelerating members 308 inserted thereinto. In this case, because the second transmitting ring 307 maintains frictional contact with the manual manipulation ring 302 that remains stationary, the second transmitting ring 307 and the first retainer 320 maintain a stationary state while the first decelerating member 308s are rotating.

Although a driving force generated by the driving element 340 is transmitted to the second transmitting ring 307 through the first transmitting ring 305 and the first decelerating members 308, the second transmitting ring 307 does not rotate because the driving force is set less than a force needed to rotate the manual manipulation ring 302.

Because a driving force generated by the driving element 340 is transmitted to the first transmitting ring 305 and the first decelerating members 308 when the second transmitting ring 307 is kept stationary, the first decelerating members 308 perform a rolling motion along the second transmitting ring 307. When the rotation velocity of the first transmitting ring 305 is V, the intermediate ring 306 and the cam 321 rotate at velocity V/2, which is one half of the rotation velocity V of the first transmitting ring 305.

When the driving element 340 operates as described above, the position of the optical element 318 can be automatically adjusted.

When a user rotates the manual manipulation ring 302, the manual adjusting mode may be performed to manually fine tune the position of the optical element 318. When the manual manipulation ring 302 rotates due to the user's manipulation, the first transmitting ring 305 rotates together with manual manipulation ring.

Although electricity is not applied to the driving element 340 while the user manipulates the manual manipulation ring 302, the input ring 311 maintains a stationary state due to a static friction force acting on the driving element 340. The static friction force refers to a force acting between the stator 313 and the rotor 312 of the driving element 340.

When the input ring 311 ceases to rotate, the first decelerating members 308 perform a rolling motion along the second transmitting ring 307 because the first transmitting ring 305 connected to the input ring 311 maintains a stationary state. This, in turn, causes the intermediate ring 306 and the cam 321 to rotate together due to the rotation of the manual manipulation ring 302, thereby enabling adjustment of the position of the optical element 318.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A device for transferring an optical element, the device comprising:
   a housing;
   a differential transmitter including an intermediate ring that is cylindrical, is disposed rotatably with respect to the housing, and has a plurality of separate openings formed along a circumference thereof, a first decelerating members inserted into respective ones of the plurality of openings so as to rotate within the openings, a first transmitting ring disposed inside or outside of the intermediate ring so as to contact the first decelerating members and rotate with respect to the intermediate ring, and a second transmitting ring disposed inside or outside of the intermediate ring and opposite to the first transmitting ring so as to contact the first decelerating members and rotate with respect to the intermediate ring;
   a driving element installed in the housing and generating a driving force upon application of a signal from outside in order to rotate the first transmitting ring;
   a manual manipulation ring disposed rotatably with respect to the intermediate ring and transmitting a rotation force generated due to manual manipulation to the second transmitting ring;
   a moving portion that supports the optical element and is disposed in the housing so as to move along the direction of an optical axis; and
   a cam rotating in connection and together with the intermediate ring, and having a cam groove connected with the moving portion.

2. The device of claim 1, wherein the second transmitting ring has a first contact surface extending in a circumferential direction so as to contact one surface of each of the first decelerating members,
   wherein the differential transmitter includes a first retainer disposed in front of the second transmitting ring and having a second contact surface extending in a circumferential direction so as to contact another surface of each of the first decelerating members, a cover ring disposed in front of the first retainer and combined with an end of the second transmitting ring, and a first elastic ring disposed between the cover ring and the first retainer and applying an elastic force.

3. The device of claim 2, wherein the manual manipulation ring includes a stepped portion projecting inward to face the cover ring,
   further comprising a second elastic ring disposed between the stepped portion and the cover ring and applying an elastic force.

4. The device of claim 3, wherein the differential transmitter further includes a pressure member that is disposed between the housing and the manual manipulation ring and presses the second transmitting ring against the manual manipulation ring.

5. The device of claim 4, further comprising:
   an input ring disposed rotatably with respect to the first transmitting ring and rotating due to the driving element; and
   an engaging member engaging the input ring with the first transmitting ring.

6. The device of claim 5, further comprising a support member disposed between the housing and the input ring and rotatably supporting the input ring with respect to the housing.

7. The device of claim 4, further comprising:
   a plurality of second decelerating members, each being inserted into a corresponding one of a plurality of second openings separated along a circumference of the first transmitting ring; and an input ring that is disposed rotatably with respect to the first transmitting ring so as to contact the second decelerating members and rotate due to the driving element.

8. The device of claim 7, wherein the input ring has a first contact surface extending in a circumferential direction so as to contact one surface of each of the second decelerating members,
further comprising a second retainer that is disposed in front of the input ring and has a second contact surface corresponding to the first contact surface and extending in a circumferential direction so as to contact another surface of each of the second decelerating members, a cover ring disposed in front of the second retainer and combined with an end of the input ring, and a third elastic ring disposed between the cover ring and the second retainer and applying an elastic force.

9. The device of claim 4, further comprising:
an input ring rotating due to the driving element;
a support ring that is rotatably disposed in front of the input ring and has a plurality of separate third openings formed in a circumferential direction at positions contacting the input ring; and
a roller rotatably combined with the third openings so as to contact the input ring and rotating around a radial axial line from a center of the support ring.

10. The device of claim 9, further comprising a support member disposed between the housing and the input ring and rotatably supporting the input ring with respect to the housing.

11. The device of claim 4, wherein the driving element is a vibration motor producing repeated vibrations upon application of an electrical signal.

12. The device of claim 4, wherein in order to maintain the stationary state of the second transmitting ring while the first transmitting ring rotates due to the driving element, a frictional force between the manual manipulation ring and the housing is set greater than a driving force generated by the driving element and transmitted through the first decelerating member and the second transmitting ring.

13. The device of claim 4, wherein in order to maintain a stationary state of the first transmission ring while the second transmission ring rotates due to the manual manipulation ring, a rotation force that is transmitted to the driving element through the first decelerating members and the second transmitting ring by rotating the manual manipulation ring due to manual manipulation is set less than a static friction force acting on the driving element that remains stationary.

14. The device of claim 4, further comprising a fixed lens barrel disposed inside the differential transmitter and kept fixed relative to the housing and having a linear groove extending in the direction of the optical axis,
wherein the moving portion has a cam protrusion fitted in the linear groove, and
wherein the cam has a cylindrical shape and is disposed between the fixed lens barrel and the differential transmitter with the cam groove engaged with the cam protrusion.

15. The device of claim 14, wherein the intermediate ring has a protrusion projecting toward the cam groove, and
wherein the cam has a groove engaged with the protrusion.

16. The device of claim 14, wherein the cam includes an outwardly projecting guide roller, and
wherein the intermediate ring has a connecting member projecting toward the guide roller and supporting an outside of the guide roller.

* * * * *